(12) United States Patent
Yoon

(10) Patent No.: US 7,887,949 B2
(45) Date of Patent: Feb. 15, 2011

(54) POLYMER BATTERY PACK AND METHOD OF MANUFACTURING THE SAME

(75) Inventor: Heui-Sang Yoon, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1027 days.

(21) Appl. No.: 11/405,673

(22) Filed: Apr. 18, 2006

(65) Prior Publication Data

US 2006/0266542 A1 Nov. 30, 2006

(30) Foreign Application Priority Data

Apr. 26, 2005 (KR) .................. 10-2005-0034725

(51) Int. Cl.
*H01M 2/02* (2006.01)
*H01M 2/22* (2006.01)
*H01B 7/36* (2006.01)

(52) U.S. Cl. .................. 429/176; 429/163; 174/112

(58) Field of Classification Search .................. None
See application file for complete search history.

(56) References Cited

U.S. PATENT DOCUMENTS

| 6,218,041 B1 | 4/2001 | Barbier et al. |
| 2003/0165736 A1 | 9/2003 | Hiratsuka |

(Continued)

FOREIGN PATENT DOCUMENTS

EP 1 071 147 1/2001

(Continued)

OTHER PUBLICATIONS

KIPO machine translation of KR20010046921, published Jun. 15, 2001, retrieved on Jan. 15, 2009.*

(Continued)

*Primary Examiner*—Dah-Wei D Yuan
*Assistant Examiner*—Stephan Essex
(74) *Attorney, Agent, or Firm*—Robert E. Bushnell, Esq.

(57) ABSTRACT

A polymer battery pack includes: a bare cell having main walls and sub-walls; a protection circuit member which is electrically connected to the bare cell; a resin sheath which encloses the sub-walls of the bare cell in such a way that the main walls are exposed to the outside; and finishing tape attached to the main walls of the bare cell. A frame case may be interposed between the bare cell and the resin sheath. In the battery pack, a strong resin sheath and finishing tape or a frame case are engaged with the bare cell, thereby reinforcing the strength of the bare cell and improving the reliability of the bare cell. Also, the battery pack does not require a separate space for the supersonic welding, and thus can receive a bare cell of high capacitance. A method of manufacturing the polymer battery pack includes forming a bare cell, forming a core pack by positioning and electrically interconnecting a protection circuit member with the bare cell, and molding a resin sheath accommodating the resin sheath enclosing the core pack and the electrode terminals of the protection circuit member are exposed to the outside. A frame case can be formed and engaged with the bare cell to be included in the core pack.

8 Claims, 24 Drawing Sheets

U.S. PATENT DOCUMENTS

| | | | |
|---|---|---|---|
| 2003/0180582 A1* | 9/2003 | Masumoto et al. | 429/7 |
| 2004/0029001 A1* | 2/2004 | Yamazaki et al. | 429/176 |
| 2004/0106038 A1* | 6/2004 | Shimamura et al. | 429/152 |
| 2007/0231687 A1* | 10/2007 | Kim et al. | 429/208 |

FOREIGN PATENT DOCUMENTS

| | | | |
|---|---|---|---|
| EP | 1 482 577 | | 12/2004 |
| JP | 2002260609 A | | 9/2002 |
| JP | 2002260621 | * | 9/2002 |
| JP | 2002260621 A | | 9/2002 |
| JP | 2004273174 | * | 9/2004 |
| KR | 20010046921 | * | 6/2001 |
| KR | 1020020030134 | * | 4/2002 |
| KR | 1020050032199 | * | 4/2005 |
| KR | 2006-0065385 | | 6/2006 |

OTHER PUBLICATIONS

JPO IPDL machine translation of JP2004273174, published Sep. 30, 2004, retrieved on Jan. 13, 2009.*

KIPO machine translation of KR1020050032199, published Apr. 7, 2005, retrieved on Mar. 25, 2010.*

JPO IPDL machine translation of JP2002260621, published Sep. 13, 2002, retrieved on Mar. 26, 2010.*

KIPO machine translation of KR1020020030134, published Apr. 24, 2002, retrieved on Mar. 26, 2010.*

European Search Report corresponding to European Patent Application No. 06113036.5 issued on Aug. 7, 2006.

* cited by examiner

POLYMER BATTERY PACK AND METHOD OF MANUFACTURING THE SAME

CLAIM OF PRIORITY

This application makes reference to, incorporates the same herein, and claims all benefits accruing under 35 U.S.C. §119 from an application for POLYMER BATTERY PACK AND METHOD OF MANUFACTURING THE SAME earlier filed in the Korean Intellectual Property Office on 26 Apr. 2005 and there duly assigned Serial No. 10-2005-0034725.

BACKGROUND OF THE INVENTION

1. Field of the invention

The present invention relates to a polymer battery pack and a method of making the same, and more particularly, to a polymer battery pack, which is improved in strength against an external impact and can receive a core pack or bare cell of large capacitance.

2. Description of the Prior Art

In general, a polymer battery pack includes a core pack having a pouch type bare cell and a protection circuit member connected to the bare cell, and a plastic case for receiving the core pack. The entire circumference of the plastic case is ultrasonic-welded in a state in which the core pack is received in the plastic case. Here, the pouch type bare cell refers to a lithium polymer battery which includes a pouch formed of cast polypropylene (CPP)/aluminum/nylon (or polyethylene-terephthalate (PET)), and an electrode assembly of positive electrode/separator/negative electrode and polymer electrolyte received in the pouch. For reference, the polymer battery pack or the lithium polymer battery are named so, in order to distinguish them from a battery pack employing liquid electrolyte and a lithium ion battery, respectively.

Meanwhile, such a polymer battery pack has a problem in that as the pouch defining the bare cell and the plastic case enclosing the pouch are poor in strength, the polymer battery pack is easily damaged by an external impact, whereby its reliability is deteriorated. Namely, because aluminum employed in forming the pouch takes the form of a foil and the plastic case enclosing the same is also very thin and poor in strength, they are easily deformed by an external force and easily pierced by a sharp-pointed nail or a needle. If the polymer battery pack is deformed by an external impact or pierced by a sharp-pointed nail or a needle as described above, smoke, flames or an explosion may be produced due to internal short or the like.

In addition, such a polymer battery pack requires a rib margin along the circumference thereof for supersonic-welding the plastic case, wherein such a rib margin occupies at least 0.8 mm (millimeters) width (0.4 mm for each side). Consequently, the size of a core pack (i.e., a bare cell) to be received in the polymer battery pack should be reduced to that extent, which means that the capacitance of battery will be also reduced. That is, because the size of the core pack received in the plastic case is relatively small as compared to that of the plastic case, a core pack of a large capacitance cannot be received in the plastic case. In fact, a conventional polymer battery pack cannot receive a core pack having a capacitance of at least about 680 mAh.

SUMMARY OF THE INVENTION

Accordingly, the present invention has been made to solve the above-mentioned problems occurring in the prior art, and an object of the present invention is to provide a polymer battery pack, which is improved in strength against an external impact and can receive a core pack or bare cell of large capacitance.

It is another object to provide the reliability of the bare cell to be improved.

It is yet another object to reduce the thickness of the frame case and the finishing tape, thereby providing increased space to provide increase in the battery capacity.

In order to achieve the above-mentioned and other objects, there is provided a polymer battery pack including: a bare cell having main walls and sub-walls; a protection circuit member which is electrically connected to the bare cell; and a resin sheath which encloses the sub-walls of the bare cell and the protection circuit member in such a way that the main walls are exposed to the outside.

Here, finishing tape may be further attached to the main walls of the bare cell.

According to another aspect of the present invention, there is provided a polymer battery pack including: a bare cell having main walls and sub-walls; a frame case which encloses the sub-walls of the bare cell in such a way that the main walls of the bare cell are exposed to the outside; a protection circuit member, which is seated on an outer surface of the frame case and electrically connected with the bare cell, a surface of the protection circuit member being formed with one or more electrode terminals; and a resin sheath, which encloses the protection circuit member in such a way that the electrode terminals are exposed to the outside.

Here, finishing tape may be further attached to the bare cell, the frame case and the resin sheath According to another aspect of the present invention, there is also provided a method of manufacturing a polymer battery pack, including the steps of: forming a bare cell by inserting an electrode assembly into a pouch having two main walls and four sub-walls and sealing the pouch; forming a core pack by positioning a protection circuit member having one or more electrode terminals at a place outside of the bare cell and electrically interconnecting the bare cell and the protection circuit member, and molding a resin sheath in such a manner that the resin sheath encloses the bare cell and the protection circuit member and the electrode terminals of the protection circuit member are exposed to the outside.

Here, the method may further include a step of attaching finishing tape to the main walls of the bare cell following the resin sheath molding step.

Still, according to another aspect of the present invention, there is provided a method of manufacturing a polymer battery pack including the steps of: providing a bare cell and a frame case, the bare cell having main walls and sub-walls and being engaged with the frame case in such a manner that the main walls of the bare cell are exposed; forming a core pack by engaging the bare cell with the frame case, seating a protection circuit member at an outer surface of the frame case, and electrically interconnecting the bare cell and the protection circuit member, and forming a resin sheath in such a manner that the resin sheath encloses the core pack and the electrode terminals of the protection circuit member are exposed to the outside.

Here, the method may further include the step of attaching finishing tape following the resin sheath molding step.

According to the present invention, it is possible to provide a battery pack which is improved in strength against an external impact and reliability, because a pouch type bare cell, which is poor in strength against an external impact is completely enclosed by a resin sheath, finishing tape and/or a frame case, which are superior in strength.

In addition, according to the present invention, because the resin sheath and the finishing tape may have a reduced thickness in the range of 0.1 mm to 0.2 mm (millimeters), it is possible to increase the capacitance of battery by a quantity corresponding to the thickness reduction of the resin sheath and the finishing tape. That is, although a conventional case requires a marginal area of about 0.8 mm width (0.4 mm for each side) for supersonic welding, such a marginal area is unnecessary according to the present invention, whereby the inventive polymer battery pack can receive a bare cell or core pack having a capacitance of at least 850 mAh (milliamp-hours).

Herein, assuming that a polymer battery pack or a bare cell takes a flat rectangular parallelepiped form, the term "main walls" is used to mean two opposite rectangular walls defined by four long sides of the rectangular parallelepiped, and the term "sub-walls" is used to mean four rectangular walls, each being defined by two long sides and two short sides of the rectangular parallelepiped and connecting the two main walls.

BRIEF DESCRIPTION OF THE DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, preferred embodiments of the present invention will be described with reference to the accompanying drawings in order for a person skilled in the art to be capable of easily embodying the present invention.

Figure 1:
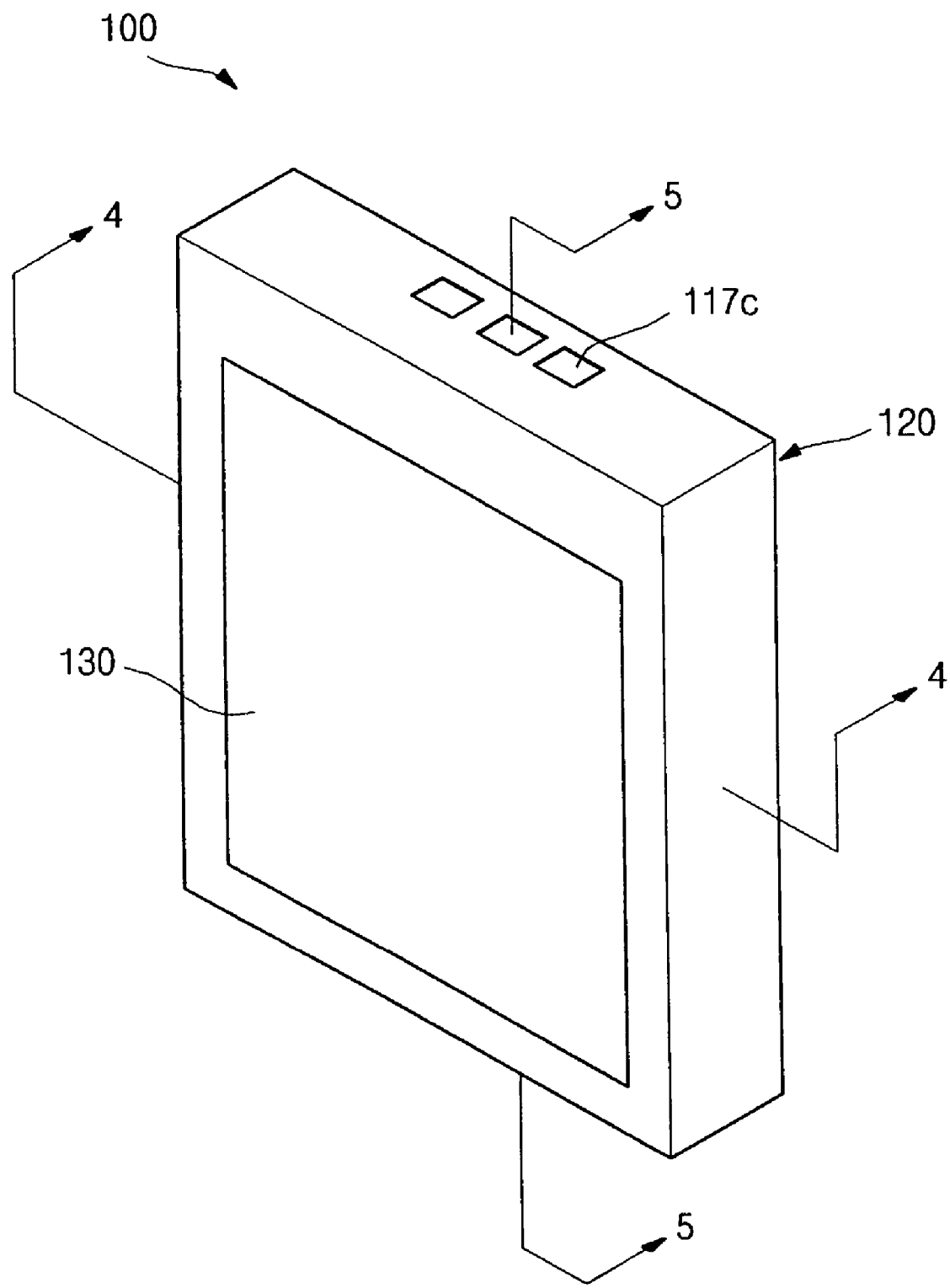
FIG. 1 is a perspective view showing a polymer battery pack according to an embodiment of the present invention.

FIG. 1 is a perspective view showing a polymer battery pack according to an embodiment of the present invention.

As shown, the polymer battery pack 100 includes a high-strength resin sheath 120 which is wrapped substantially around four sub-walls of the polymer battery pack 100, and finishing tape 130 for covering opposite openings which are formed in the resin sheath 120 and positioned on the opposite main walls of the battery pack 100. Here, one or more electrode terminals 117c for charging/discharging are exposed to the outside through one of the side walls of the resin sheath 120.

Figure 2:
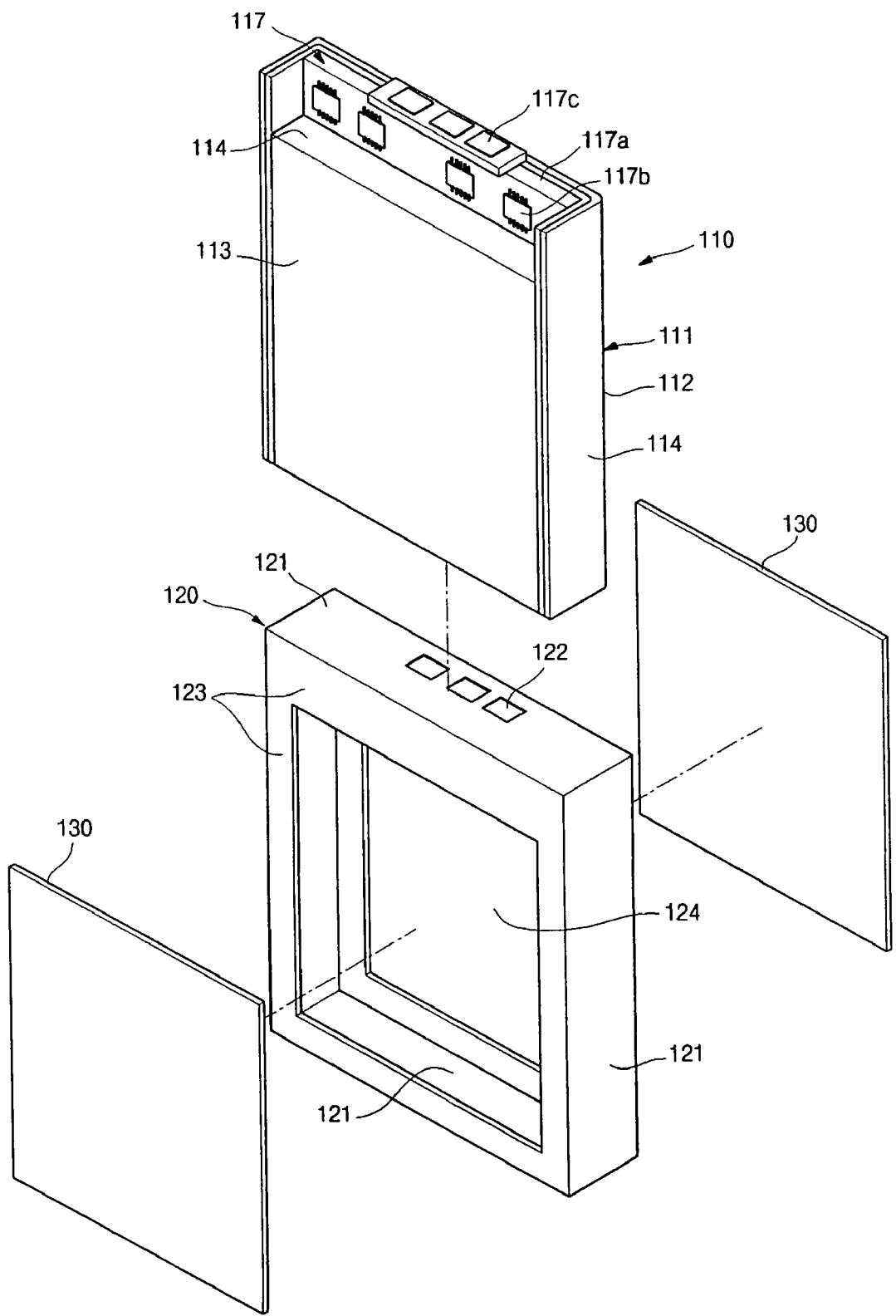
FIG. 2 is an exploded perspective view of the polymer battery pack of FIG. 1.

FIG. 2 is an exploded perspective view of the polymer battery pack shown in FIG. 1.

As shown, the polymer battery pack 100 includes: a core pack 110 with a protection circuit member 117 attached to a bare cell 111; a resin sheath 120 substantially enclosing the core pack 110 in such a manner that the opposite main walls of the bare cell 111 are disposed to the outside; and finishing tape 130 for covering the opposite main walls of the bare cell 111 exposed through the resin sheath 120.

The bare cell 111 of the core pack 110 may be a conventional lithium polymer battery. A pouch 112 forms the outer wall of the bare cell 111. The pouch 112 has two main walls 113, each having a relatively large area, and four sub-walls, each having a relatively small area as compared to the main walls, wherein the main walls are formed in two opposite sides of the pouch 112 and four sub-walls 114 are formed between the two main walls of the pouch 112 and extend along four sides of the main walls 112. Here, three sub-walls among the four sub-walls 114 are thermally welded to each other, and the sub-walls 114, which are vertically extend at the left and right sides of the bare cell 111 with reference to the view of FIG. 2, are bent toward the front side of the bare cell 111 at a predetermined angle, so that the width of the bare cell 111 can be minimized. In addition, the protection circuit member 117 is seated on the top of the bare cell 110 between the left and right sub-walls 114. The protection circuit member 117 includes a print circuit board 117a, one or more electronic components 117b mounted on the print circuit board 117a, and one or more electrode terminals 117c for charging/discharging, which are mounted on the top of the print circuit board 117a.

The resin sheath 120 is formed in such a manner that the two main walls 113 of the bare cell 111 are exposed. More particularly, the resin sheath 120 has four peripheral walls 121, which enclose the four sub-walls 114 of the bare cell 111, respectively. Of course, the resin sheath 120 also encloses the circuit protection member 117 and one or more openings 122 are formed through the top side peripheral wall 121 of the resin sheath 120 so as to expose the electrode terminals 117c. Furthermore, the resin sheath 120 is formed with extensions 123, which internally extend from the peripheral walls 121 thereof over the main walls 113 of the bare cell 111 by a predetermined width. Accordingly, the extensions 123 substantially cover the predetermined parts of the main walls 113 of the bare cell 111. The main walls 113 of the bare cell 111 are exposed to the outside through openings 124, which are defined and surrounded by the extensions 123, until the finishing tape 130 is attached. The resin sheath 120, which has peripheral walls 121 and extensions 123 as described above, can be formed through a resin molding process. Here, the resin sheath may be formed by molding a material selected from polyamid, polyurethane, plastic, fiber reinforced plastic, engineering plastic, hot melt resin, etc. For example, the resin sheath 120 may be formed by inserting the core pack 110 into a mold, filling hot melt resin into the mold under high temperature and high pressure, and then curing the hot melt resin. Here, the hot melt resin is a resin, which is capable of being molted at a temperature in the range of about 140° C. to 160° C. (Celsius).

In addition, the thickness of the peripheral walls 121 and extensions 123 is selected in the range of about 0.1 mm to 0.2 mm (millimeters), so that the resin sheath 120 could receive a core pack 110 of large capacitance (at least 850 mAh). As mentioned above, in the prior art, a marginal area of about 0.8 mm (about 0.4 mm for each edge) was needed for supersonic welding. However, as such a margin for supersonic welding is not required according to the present invention, a core pack 110, which is substantially larger than a conventional core pack, can be received in a case which is substantially the same with a conventional case in size. Meanwhile, if the thickness of the resin sheath 120 is not more than 0.1 mm, it is too thin to secure a desired strength. However, if the thickness of the resin sheath 120 is not less than 0.2 mm, the resin sheath 120 becomes too thick and weighty, although the desired strength could be secured. Of course, the thickness of the resin sheath 120 is not applied to the area for enclosing the protection circuit member 117. Namely, the resin sheath 120 may be sufficiently thick at the area for enclosing the protection circuit member 117.

As being attached to the openings 124 defined by the resin sheath 120, that is, to terminal walls 113 of the bare cell 111 exposed through the openings 124, the finishing tape 130 completely encloses the core pack 110 in cooperation with the resin sheath 120. Such finishing tape 130 is attached to the main walls 113 of the bare cell 111 by conventional adhesive or glue. In addition, the finishing tape 130 may be preferably, but not exclusively formed of polyethyleneterephthalate (PET) or the like. Of course, the finishing tape 130 may be formed of various metallic materials. The finishing tape 130 also has a thickness of about 0.1 to 0.2 mm. If the thickness of the finishing tape 130 is not more than 0.1 mm, it is too thin to secure a desired strength, and if the thickness of the finishing tape 130 is not less than 0.2 mm, it is too thick and weighty, although a desired strength could be secured.

Figure 3:
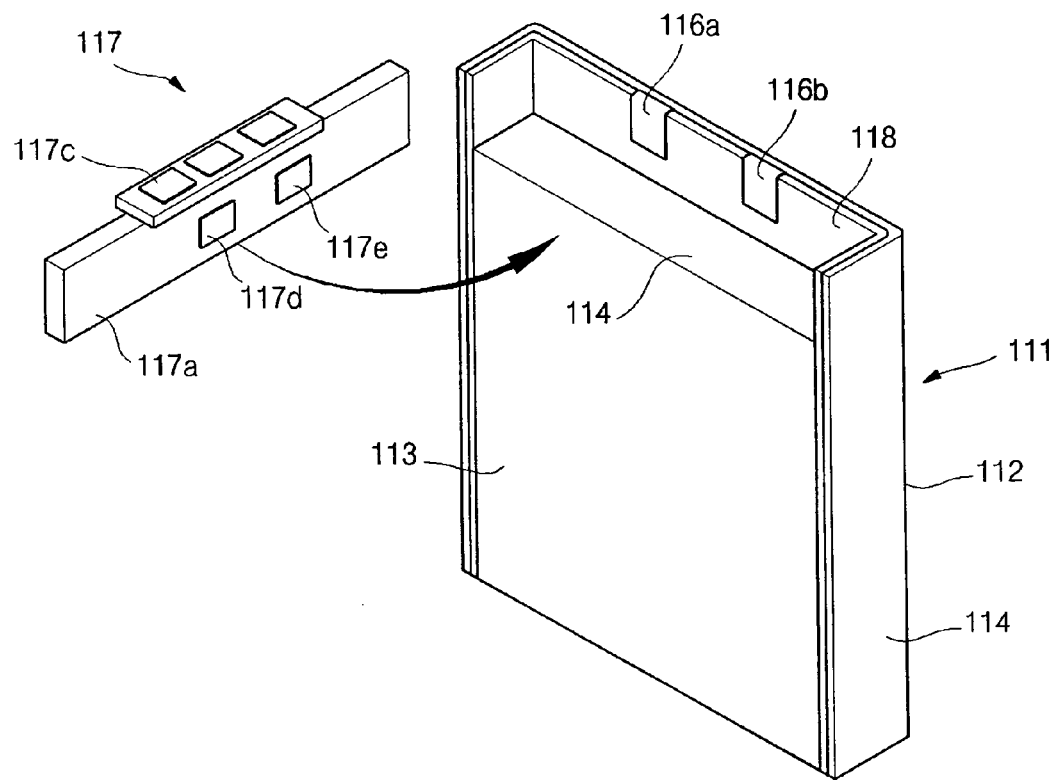
FIG. 3 is a perspective illustrating how to connect a protection circuit member to a bare cell in the polymer battery pack of FIG. 1.

FIG. 3 is a perspective view showing how to connect the protection circuit member to the bare cell in the polymer battery pack of FIG. 1.

As shown, electrode tabs 116a and 116b of a given length extend through the top area 118 of the pouch 112 of the bare cell 111, thereby being exposed. In addition, the print (or printed) circuit board 117a of the protection circuit member 117 is formed with conductive pads 117d and 117e so that the electrode tabs 116a and 116b can be electrically connected to the protection circuit member 117. Therefore, the conductive pads 117d and 117e and the electrode tabs 116a and 116b are connected with each other through supersonic welding, laser welding, resistance welding, soldering or the like, and the protection circuit member 117 is stably seated on the top area 118 of the bare cell 111 with such connection.

Figure 4:
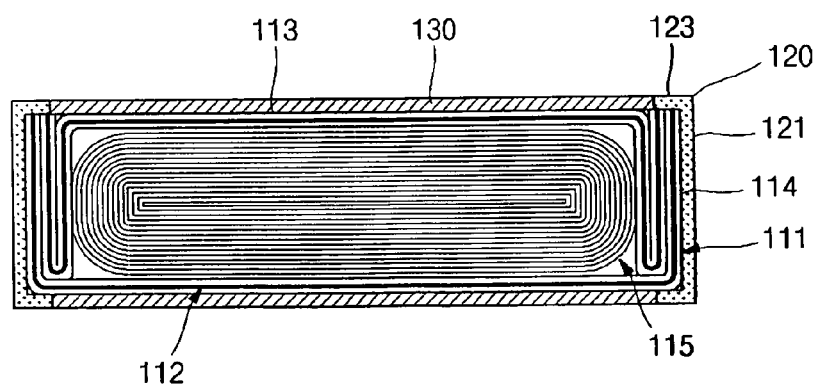
FIG. 4 is a cross-sectional view taken along line 4-4 of FIG. 1.

FIG. 4 is a cross-sectional view taken along line 4-4 of FIG. 1.

As shown, an electrode assembly 115 having plural windings is housed in the inner side of the main walls 113 and sub-walls 114 of the pouch 112 of the bare cell 111. The constructions of the pouch 112 and the electrode assembly 115 will be described later in detail. Because the left and right sub-walls 114 of the pouch 112 are bent in the predetermined direction, the volume occupied by the bare cell 111 can be minimized. In addition, the sub-walls 114 and predetermined areas of the main walls 113 adjacent to the sub-walls 114 are enclosed by the resin sheath 120. In addition, the finishing tape 130, which is formed substantially in a sheet-like shape, is attached to the main walls 113 of the bare cell 111, which are exposed through the resin sheath 120. Namely, the outer surfaces of the bare cell 111 are substantially completely enclosed by the resin sheath 120 and the finishing tape 130. As the pouch 112 of the bare cell 111, which is poor in strength, is directly enclosed by the resin sheath 120 and the finishing tape 130, which are superior in strength, the strength of the bare cell 111 against an external impact can be increased. Furthermore, because an excessive marginal area for supersonic welding is not required in the resin sheath 120 unlike the prior art, it is possible to receive a larger bare cell, whereby the battery capacitance can be generally increased.

Figure 5:
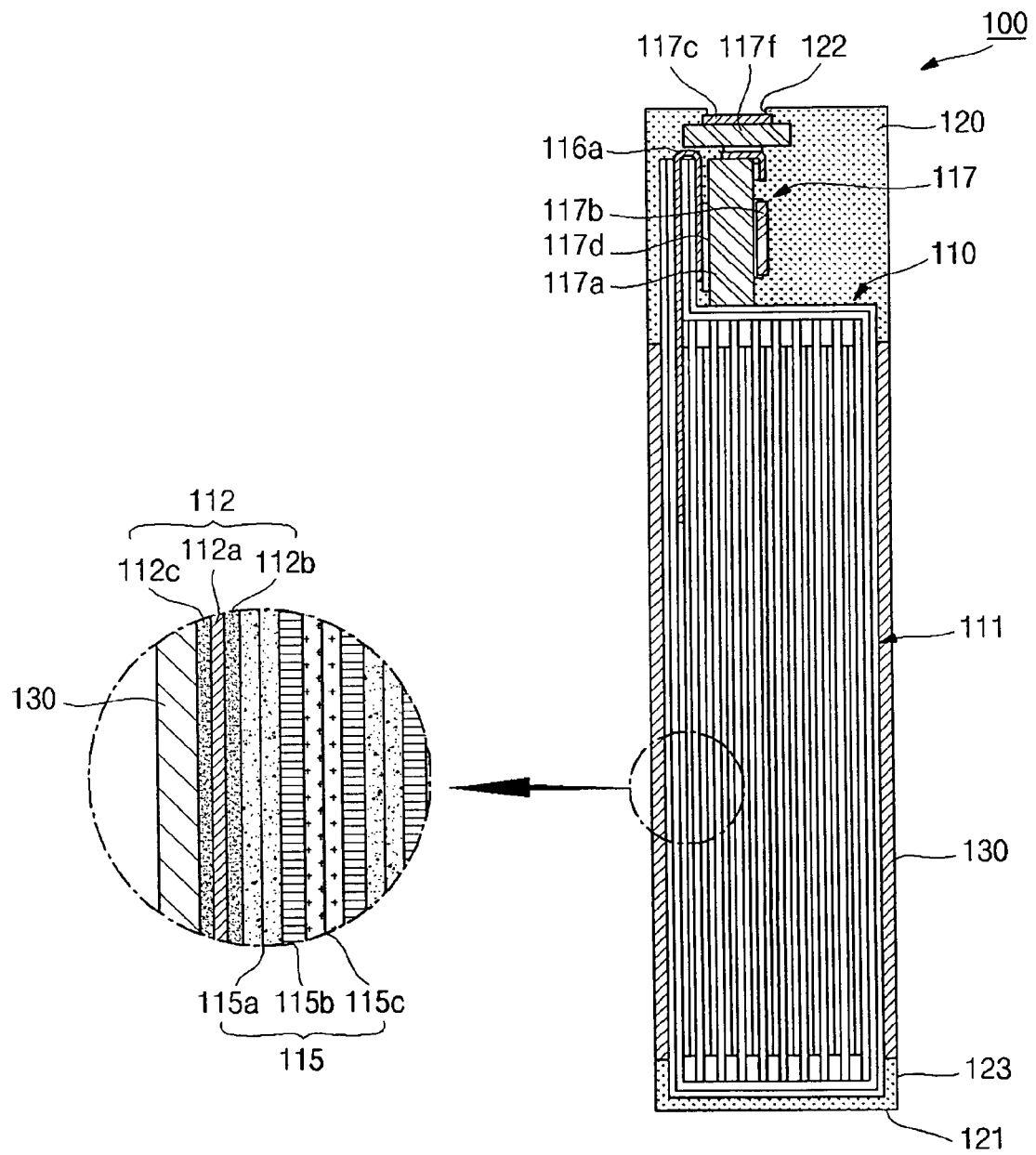
FIG. 5 is a cross-sectional view taken along line 5-5 of FIG. 1.

FIG. 5 is a cross-sectional view taken along line 5-5 of FIG. 1.

As shown, the bare cell 111 and the protection circuit 117 in the polymer battery pack 100 are enclosed by the resin sheath 120 and the finishing tape 130. As mentioned above, the subassembly of the bare cell 111 and the protection circuit member 117 is named as "core pack." In addition, the outside of the bare cell 111 is enclosed by the pouch 112. The pouch includes a metallic layer 112a, a first insulation layer 112b formed on one side of the metallic layer 112a, and a second insulation layer 112c formed on the other side of the metallic layer 112a. The metallic layer 112a may be preferably but not exclusively formed from aluminum, steel, stainless steel or the like. In addition, the first insulation layer 112b may be preferably but not exclusively formed from cast polypropylene (CPP) or the like, and the second insulation layer 112c may be preferably but not exclusively formed from nylon, polyethyleneterephthalate (PET), or the like.

Meanwhile, the pouch 112 receives an electrode assembly 115, which includes a first electrode 115a, a separator 115b, and a second electrode 115c, which are wounded plural times. The first electrode 115a may include a first electricity collector as a core and a first active material coated on the opposite surfaces of the first electricity collector, and the second electrode 115b may include a second electricity collector as a core and a second active material coated on the opposite surfaces of the second electricity collector. For example, the first electrode 115a is a positive electrode, wherein the first collector may be an aluminum foil and the first active material may be lithium cobalt oxide ($LiCoO_2$). In addition, the second electrode 115b is a negative electrode, wherein the second electricity collector may be a copper foil and the second active material may be a carbon-based material. In addition, a first conductive electrode tab 116a is connected to the first electricity collector of the first electrode 115a and extends to the outside of the pouch 112 by a predetermined length, and a second conductive electrode tab 116b is connected to the second electricity collector of the second electrode 115c. In the drawing, only the first conductive electrode tab 116a is shown among the conductive electrode tabs. Of course, the separator 115b is interposed between the first electrode 115a and the second electrode 115c, wherein the separator 115b is formed from a porous material, through which only lithium ions are allowed to pass.

In addition, the protection circuit member 117 is connected to the conductive electrode tab 116a which extends to the outside of the pouch 112. That is, a conductive pad 117d is formed on the print suit board 117a of the protection circuit member 117 and electrically connected to the first conductive electrode tab 116a. Although not shown in the drawing, another conductive pad 117e is connected to the second conductive electrode tab 116b.

In addition, electrode terminals 117c are provided on an insulator 117f above the top end of the print circuit board 117a of the protection circuit board 117. Of course, the electrode terminals 117c are electrically connected with the print circuit board 117a. In addition, the electrode terminals 117c are exposed to the outside through the openings 122 defined by the resin sheath 120.

As a result, according to the inventive polymer battery pack the pouch type bare cell, the outer walls of which are poor in strength, is completely enclosed by the resin sheath and the finishing tape as described above, whereby the outer walls of bare cell can be reinforced and the reliability of the bare cell can be improved.

In addition, according to the inventive polymer battery pack, the thickness of the resin sheath and the finishing tape, which enclose the main walls and sub walls of the pouch, can be reduced to about 0.1 mm to 0.2 mm, whereby the battery capacitance can be increased by a space, which is additionally obtained as the thicknesses of the resin sheath and the finishing tape are reduced.

Figure 6:
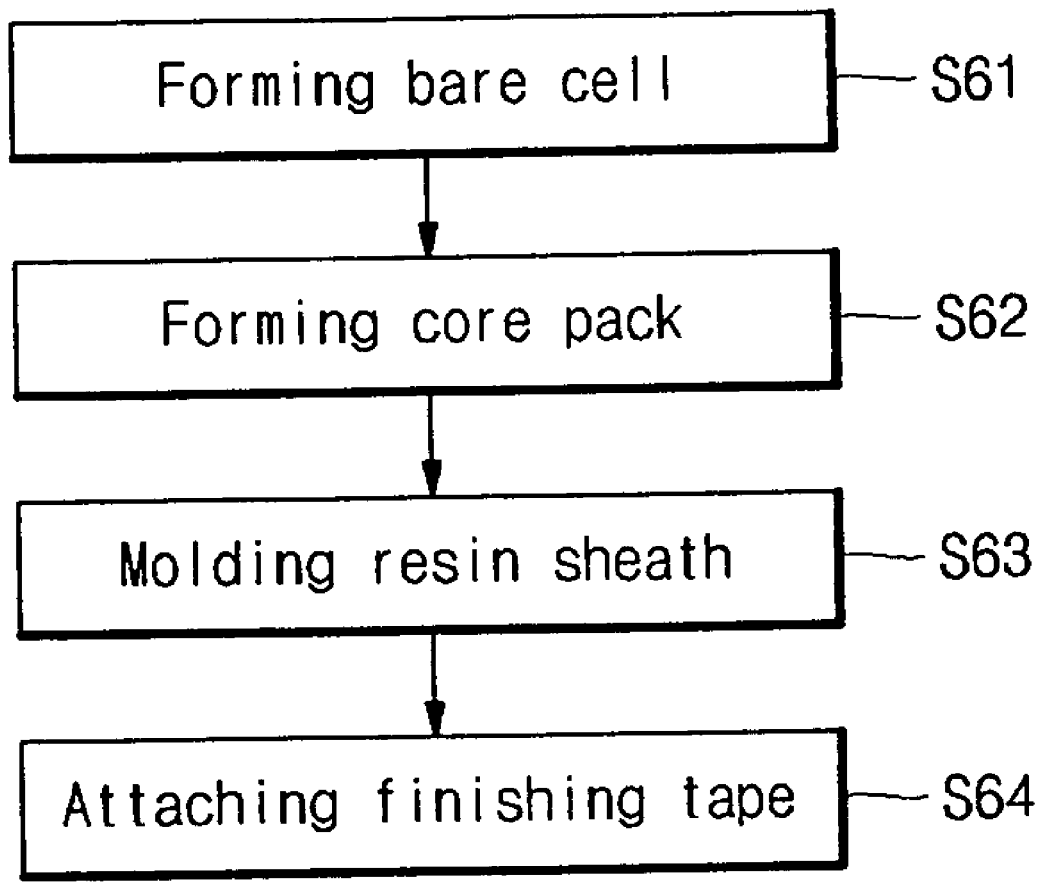
FIG. 6 is a flowchart showing a method of manufacturing the polymer battery pack of FIG. 1.

FIG. 6 is a flowchart showing a polymer battery pack manufacturing method according to an embodiment of the present invention.

As shown in FIG. 6, the inventive polymer battery pack manufacturing method includes steps of: forming a bare cell 111 by inserting an electrode assembly into a pouch 112 and sealing the pouch 112 (S61); forming a core pack 110 by connecting a protection circuit member 117 having one or more electrode terminals and positioned outside of the bare cell 111 to the exterior of the bare cell 111 (S62); molding a resin sheath 120 so that sub-walls of the bare cell 111 and the protection circuit member 117 in the core pack 110 are enclosed by the resin sheath 120 and two main walls 113 of the bare cell 111 are exposed to the outside (S63); and attaching finishing tape 130 to the main walls 113 of the bare cell 111, which are exposed to the outside through the resin sheath 120 (S64).

FIGS. 6a to 6g show the inventive polymer battery pack manufacturing method in sequence.

Each step of the manufacturing method is now described in more detail with reference to FIGS. 6a to 6g. However, since the materials, features or the like of respective components are same with those described above, the following description is made principally in terms of the polymer battery pack manufacturing method.

Figure 6A:
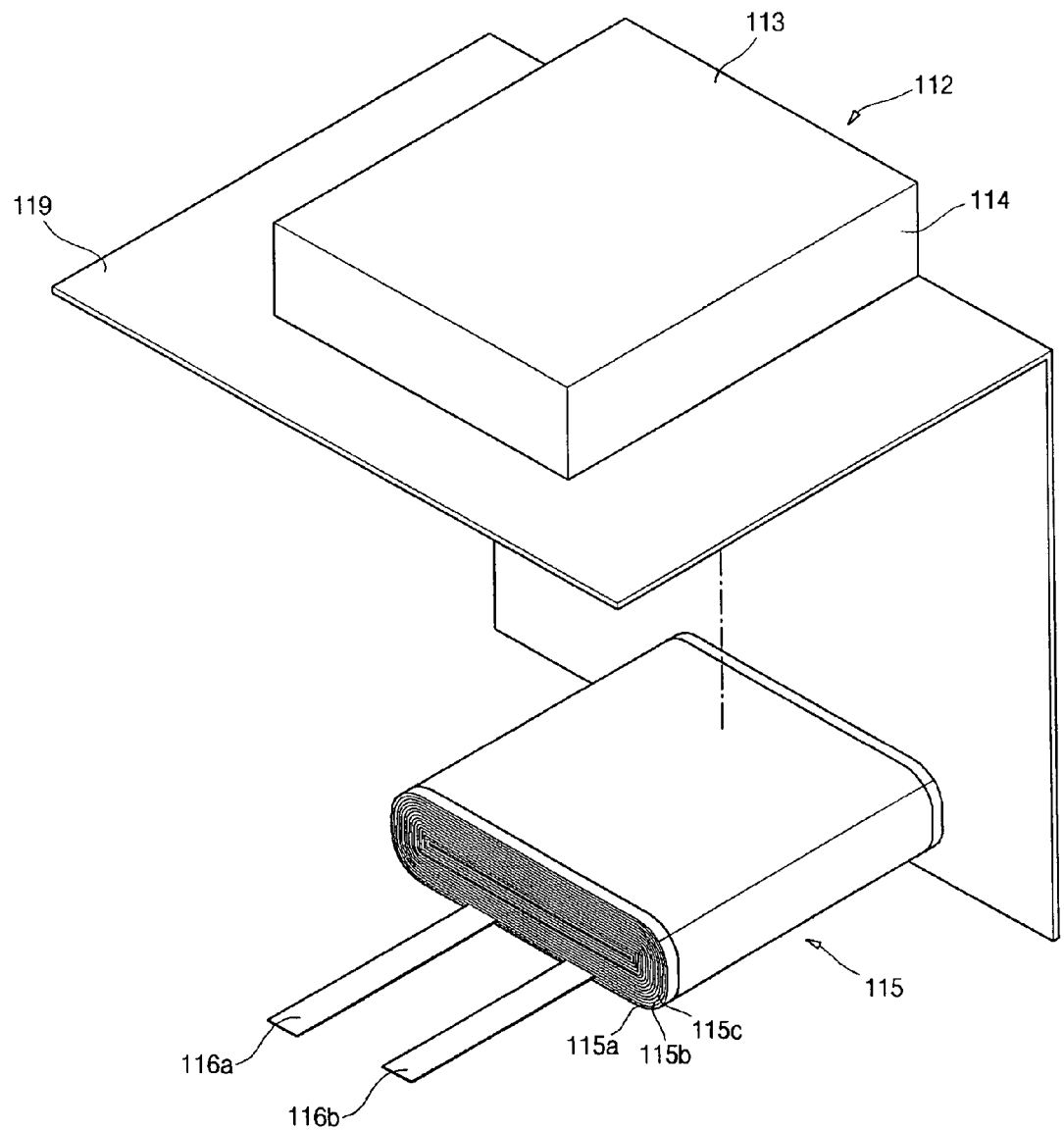
FIGS. 6a through 6g show the steps of the polymer battery pack manufacturing method of FIG. 6 in sequence.
Figure 6B:
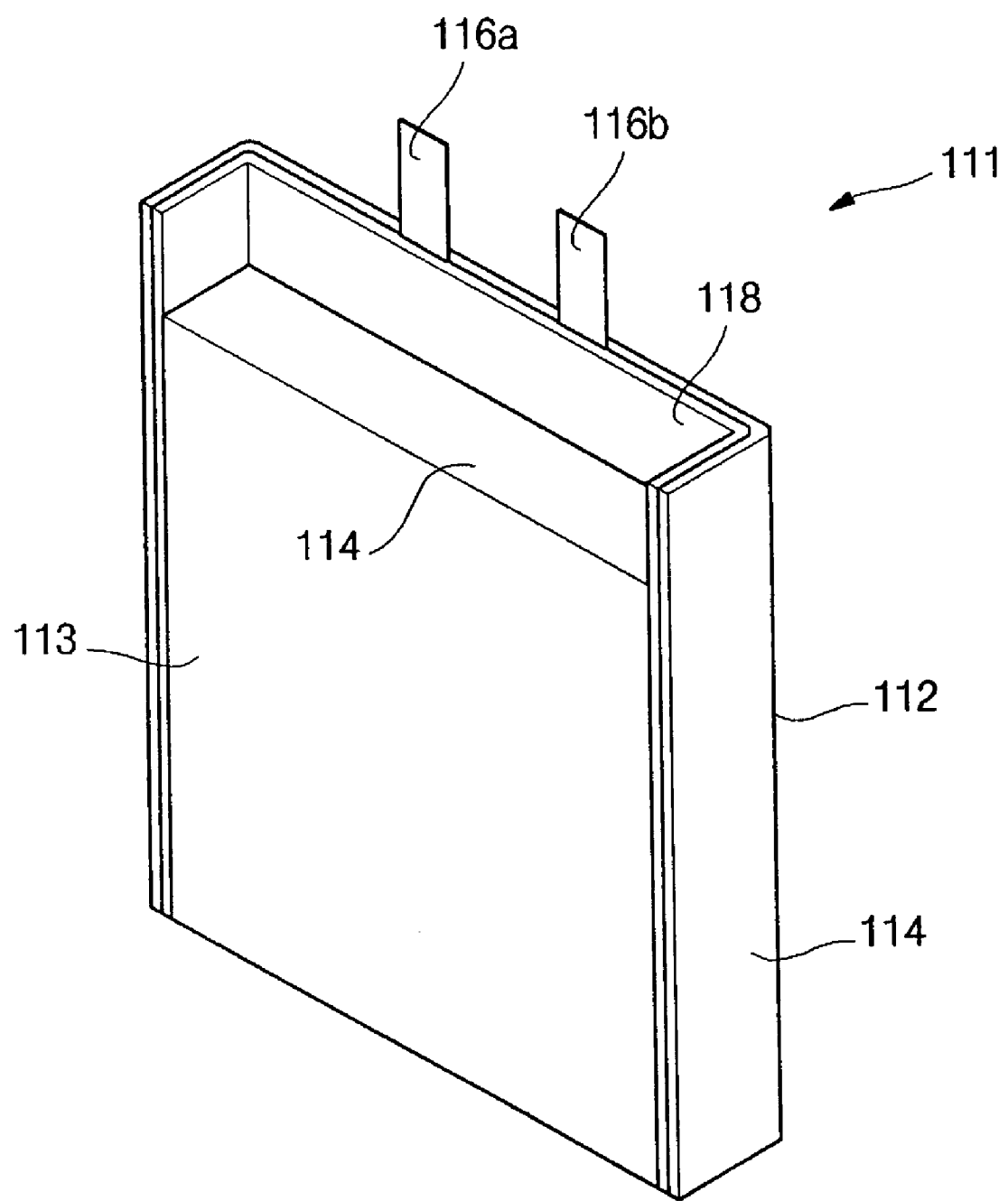

FIGS. 6a and 6b show the bare cell forming step (S61).

In the bare cell forming step (S61), an electrode assembly 115 is received in a pouch 112 and the pouch 112 is sealed, wherein the electrode assembly 115 includes a first electrode 115a, a separator 115b and a second electrode 115c, which are wounded in a rolled jelly form, a first conductive electrode tab 116a, which is connected to the first electrode 115a, and a second conductive electrode tab 116b, which is connected to the second electrode 115c. At this time, the first and second conductive electrode tabs 116a and 116b are extend by a predetermined length to the outside of the pouch 112, thereby being exposed. Here, the pouch 112 has two opposite main walls 113, and four sub-walls 114 defined between and along the two opposite main walls 113. In addition, among the four sub-walls 114, each of three sub-walls 114 has a marginal area 119 extending by a predetermined width from the edge thereof, wherein each marginal area 119 is thermally welded to its corresponding sub-wall 114, thereby preventing the electrode assembly 115 from getting away from the pouch 112. Furthermore, the laterally opposite marginal areas 119 are bent in a predetermined direction so as to minimize the size of the pouch 112. Hereinbelow, the bent areas are also called as sub-walls 114, and the remaining unbent area is called as top area 118. The fist and second conductive electrode tabs 116a and 116b extend to the outside through the top area 118, thereby being exposed.

Figure 6C:
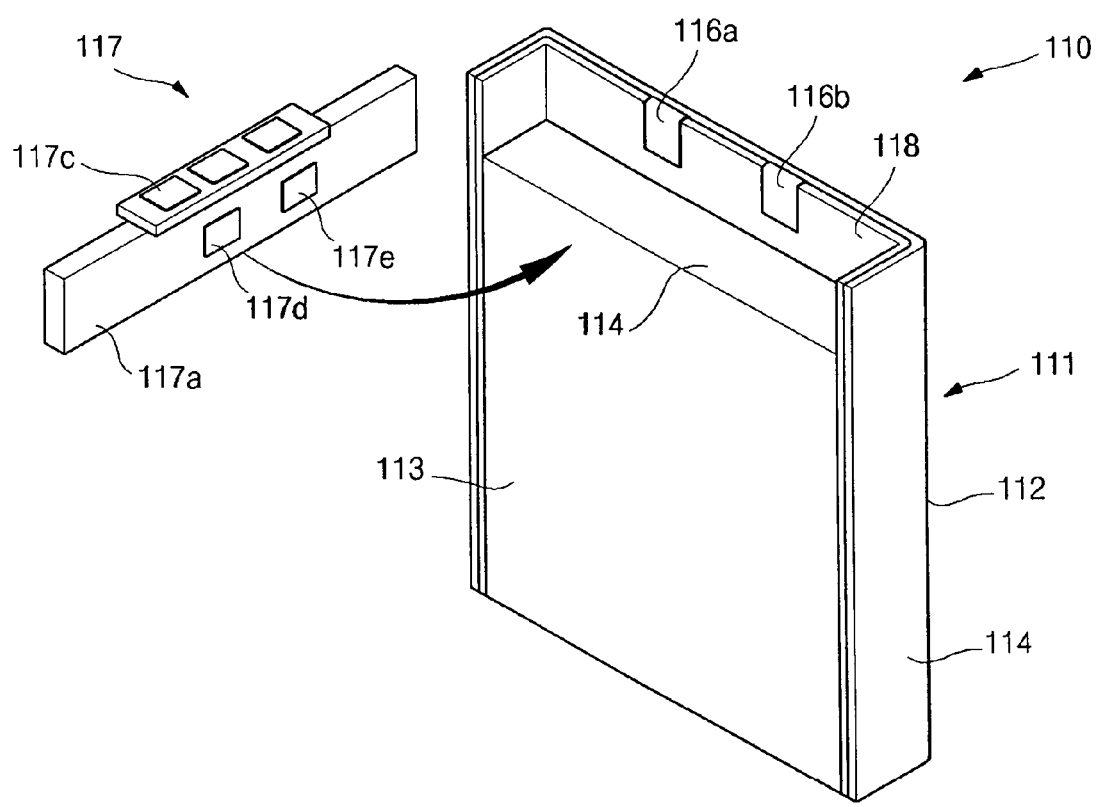

FIG. 6c shows the core pack forming step (S62).

In the core pack forming step (S62), the protection circuit member 117 is mechanically and electrically connected to the bare cell 111. That is, the protection circuit member 117, which includes a print circuit board 117a, one or more electronic components 117b (refer to FIG. 6d), one or more terminals 117c, etc., are mechanically and electrically connected to the conductive electrode tabs 116a and 116b, which are exposed to the outside of the pouch 112 of the bare cell 111. At this time, the protection circuit member 117 is positioned at a place defined by the top area 118 of the pouch 112 of the bare cell 111. As described above, the subassembly of the bare cell 111 and the protection circuit member 117 is called as core pack 110, wherein the protection circuit member is seated on the bare cell 111.

Figure 6D:
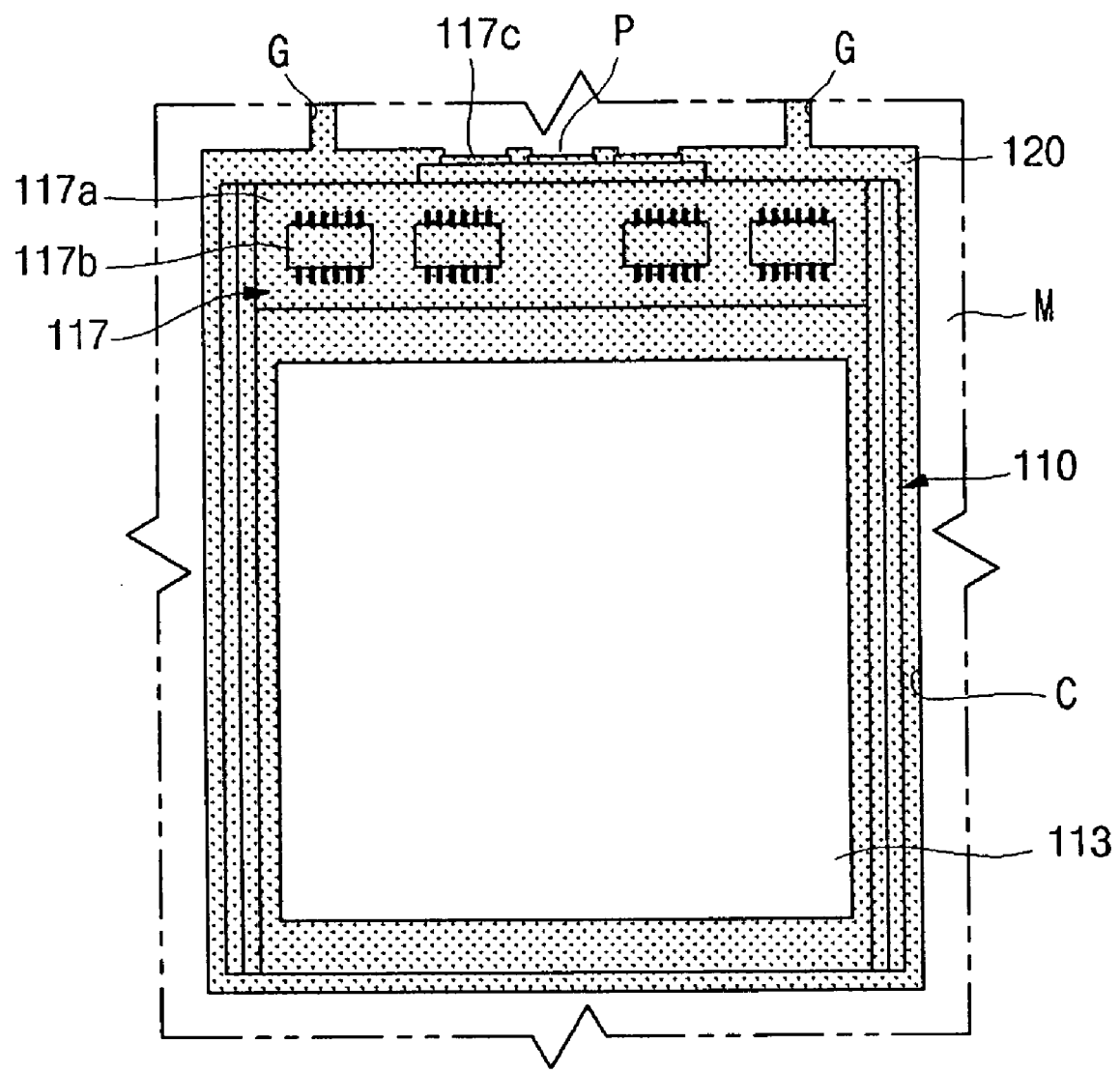
Figure 6E:
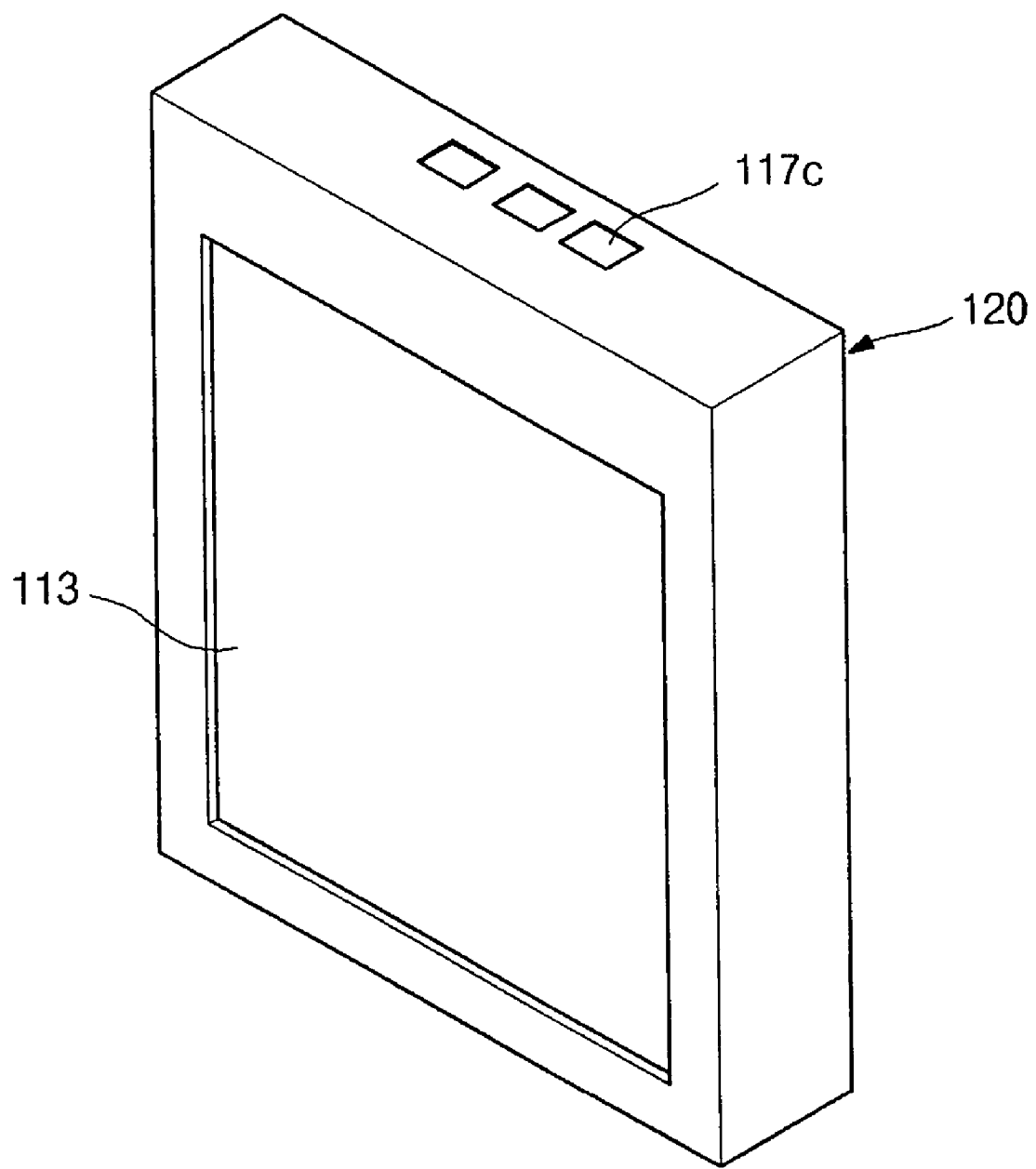

FIGS. 6d and 6e show the resin molding step (S63).

In the resin molding step (S63), a molding method employing a mold M is basically employed. That is, a core pack 110 having the connected protection circuit member 117 is settled in the mold M which has a cavity of a predetermined shape. At this time, a predetermined main wall 113 of the bare cell 111 of the core pack 110 comes into close contact with a predetermined projection (not shown) in the mold M. In addition, the electrode terminals 117c of the protection circuit member 117 also come into close contact with a projection P of the mold M. Of course, gaps are formed in the other areas between the core pack 110 and the mold M. Therefore, if a resin, for example, polyamid, polyurethane, plastic, fiber reinforced plastic, engineering plastic, hot melt resin (being melted at a temperature in the range of 140° C. to 160° C.) or the like, is filled in the gaps through a gate G under high temperature and high pressure and then cooled to a predetermined temperature, the resin sheath 120 is formed which encloses the entire surface of the core pack 110 except the main walls 113 and the electrode terminals 117c.

Figure 6F:
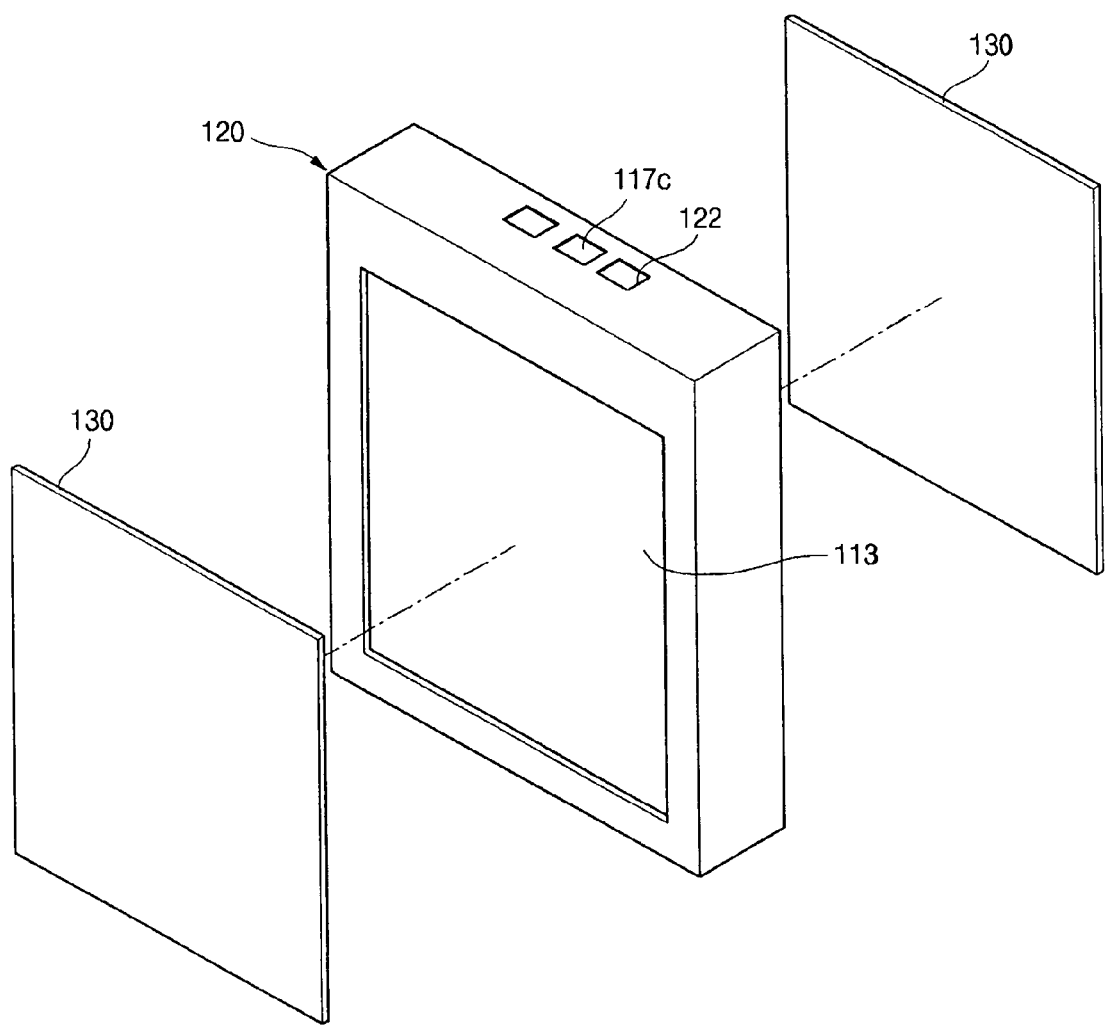
Figure 6G:
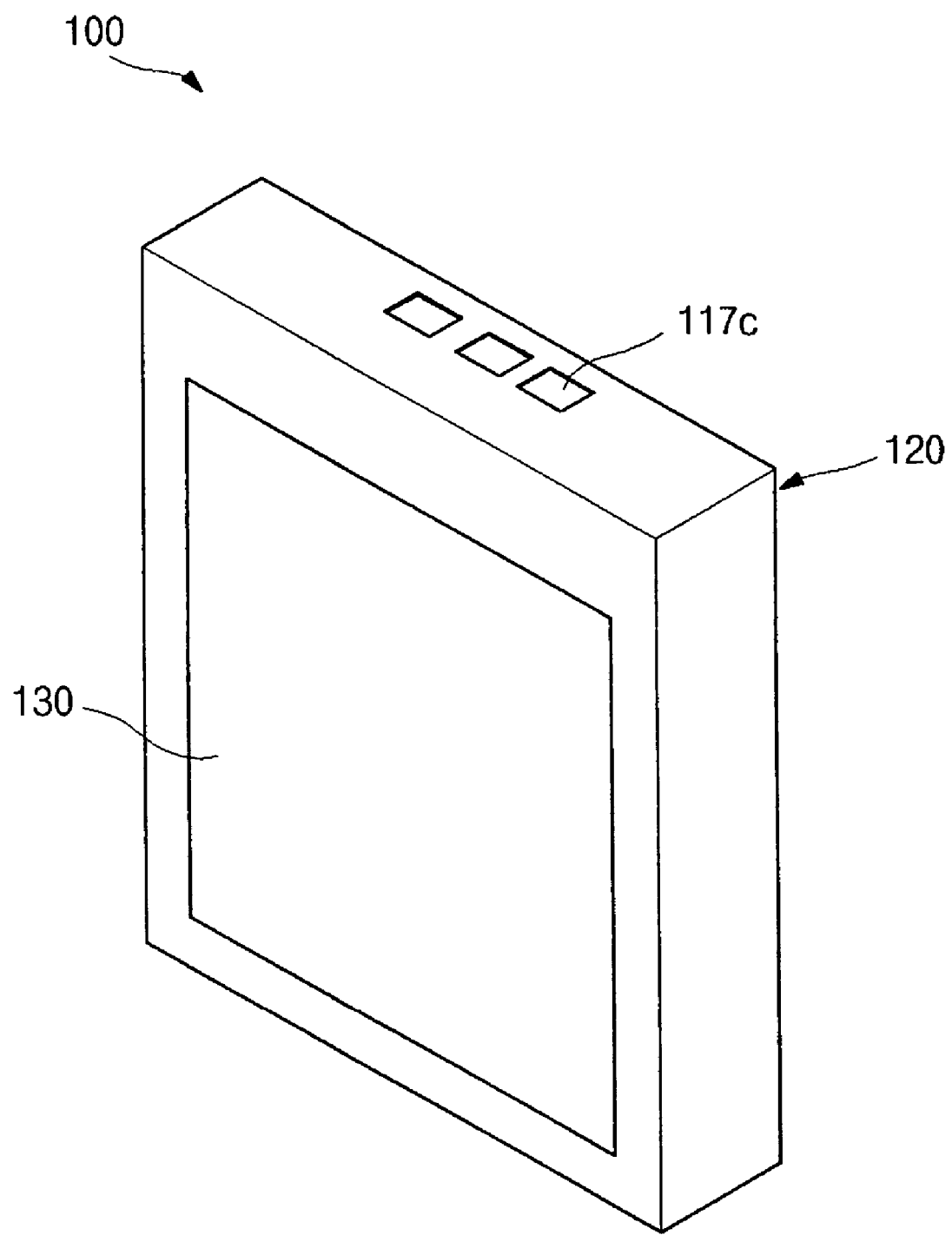

FIGS. 6f and 6g show the finishing tape attaching step (S64).

In the finishing tape attaching step (S64), the inventive polymer battery pack 100 is completed by attaching finishing tape 130 to the main walls 113 of the bare cell 111, which are exposed through the resin sheath 120. The finishing tape 130 is adhered to the main walls 113 of the bare cell 111 by adhesive, glue or the like. At this time, the finishing tape 130 may be formed from polyethyleneterephthalate (PET), metallic material, or the like so as to secure a desired strength and a reduced thickness, which is preferably in the range of 0.1 mm to 0.2 mm. In this manner, the core pack takes a form of being completely enclosed by the resin sheath 120 and the finishing tape 130. The electrode terminals 117c of the protection member 117 are exposed to the outside through the openings 122 of the resin sheath 120.

Figure 7:
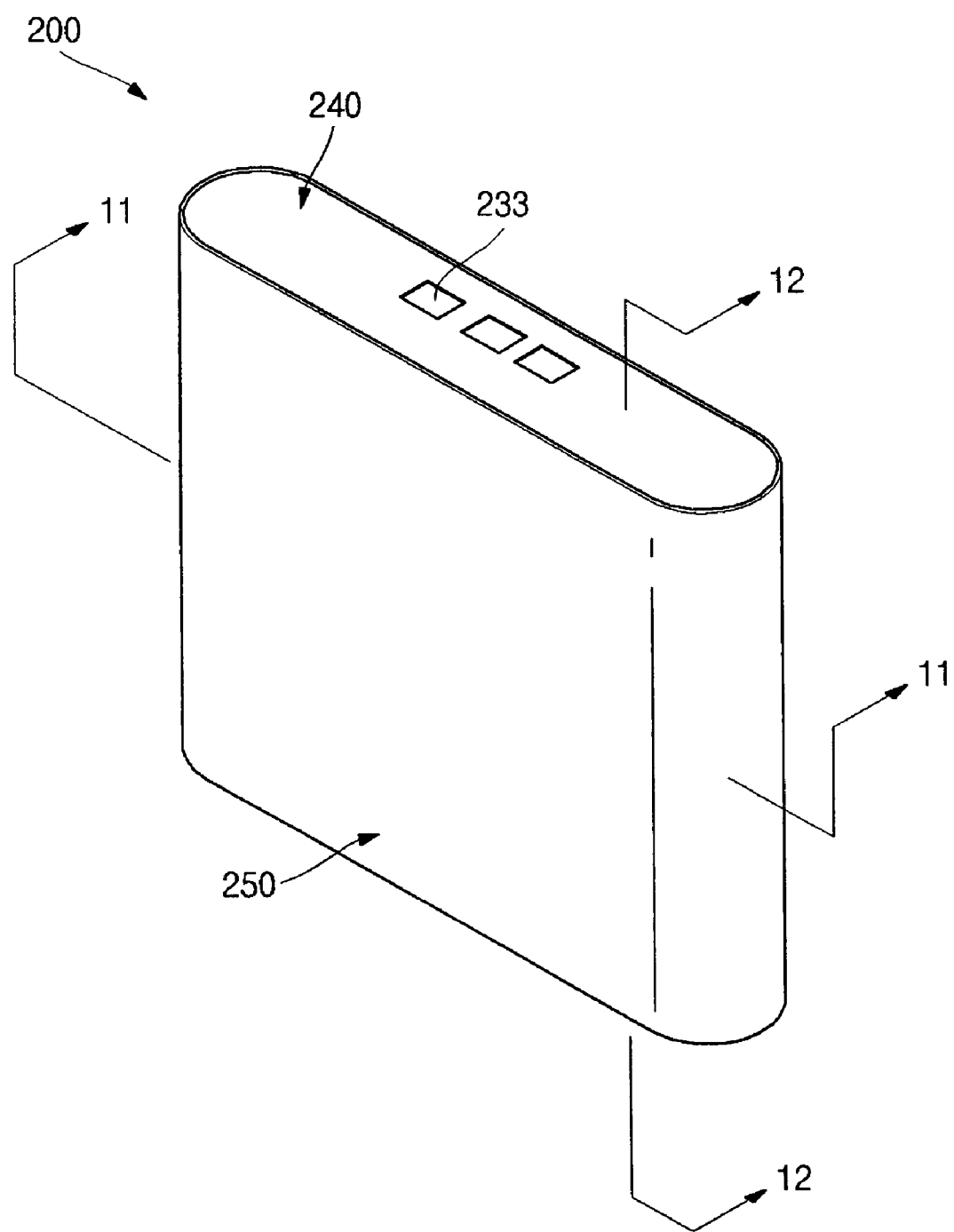
FIG. 7 is a perspective view showing a polymer battery pack according to another polymer battery pack.

FIG. 7 is a perspective view showing a polymer battery pack according to another embodiment of the present invention.

As shown, the inventive polymer battery pack 200 takes a thin hexahedral shape and includes a high strength resin sheath 240 having two laterally opposite peripheral walls, each of which is formed in a round shape, and finishing tape 250 which is wrapped around the hexahedral resin sheath 240 in the horizontal direction at least one time. Here, one or more electrode terminals 233 for charging/discharging are exposed to the outside through the top area of the resin sheath 240.

Figure 8:
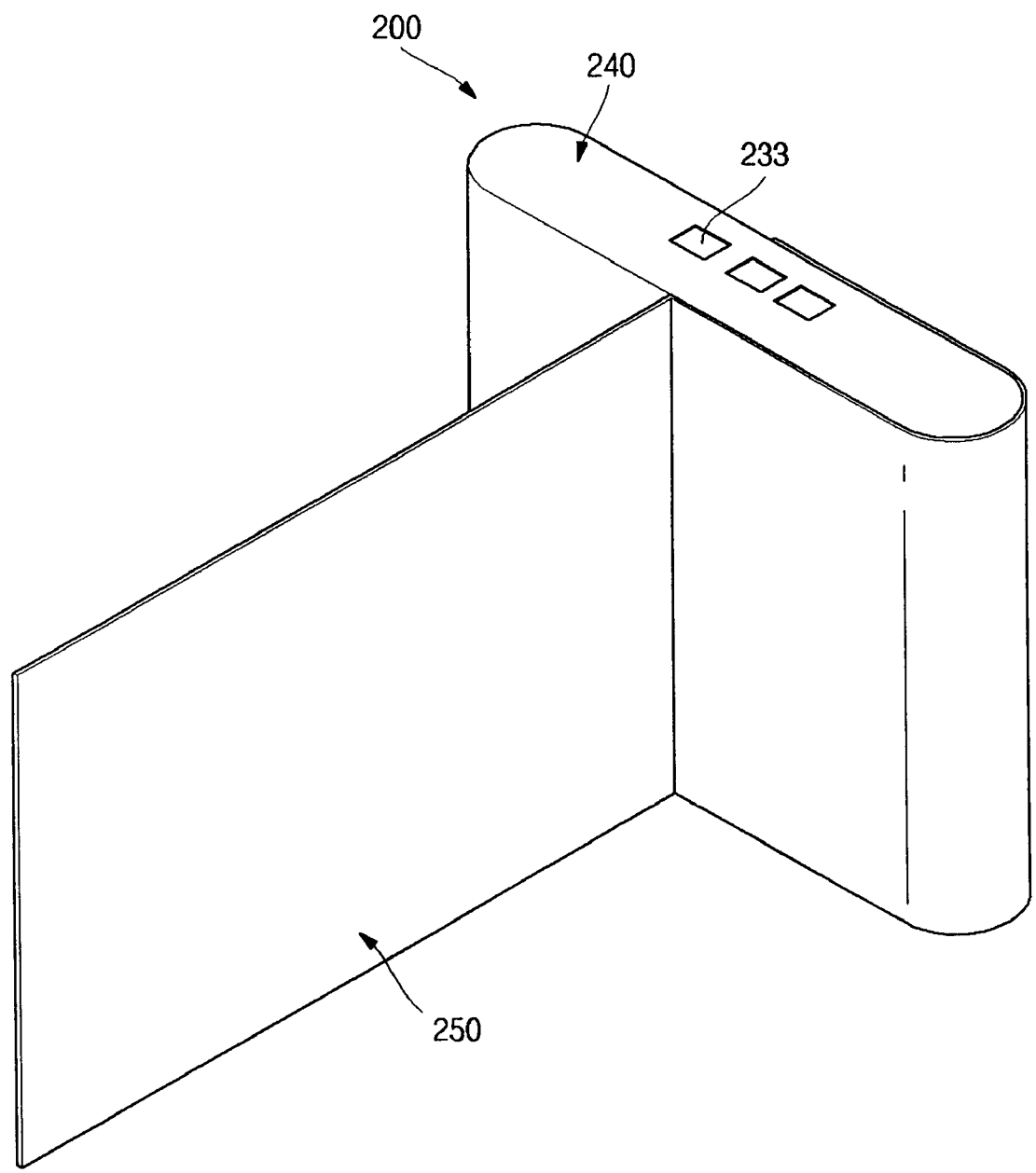
FIG. 8 is a perspective view of how to adhere finishing tape in the polymer battery pack of FIG. 7.

FIG. 8 is a perspective view illustrating how to adhere finishing tape in the polymer battery pack of FIG. 7.

As shown, the finishing tape 250 is wrapped around the resin sheath 240 of the inventive polymer battery pack 200 in the horizontal direction at least one time. On the surface of the finishing tape 250, it is possible to print the manufacturer's name, manufactured date, type of the battery pack, or the like. Occasionally, the finishing tape 250 may not be directly adhered to the surface of the resin sheath 240 of the polymer battery pack 200.

Figure 9:
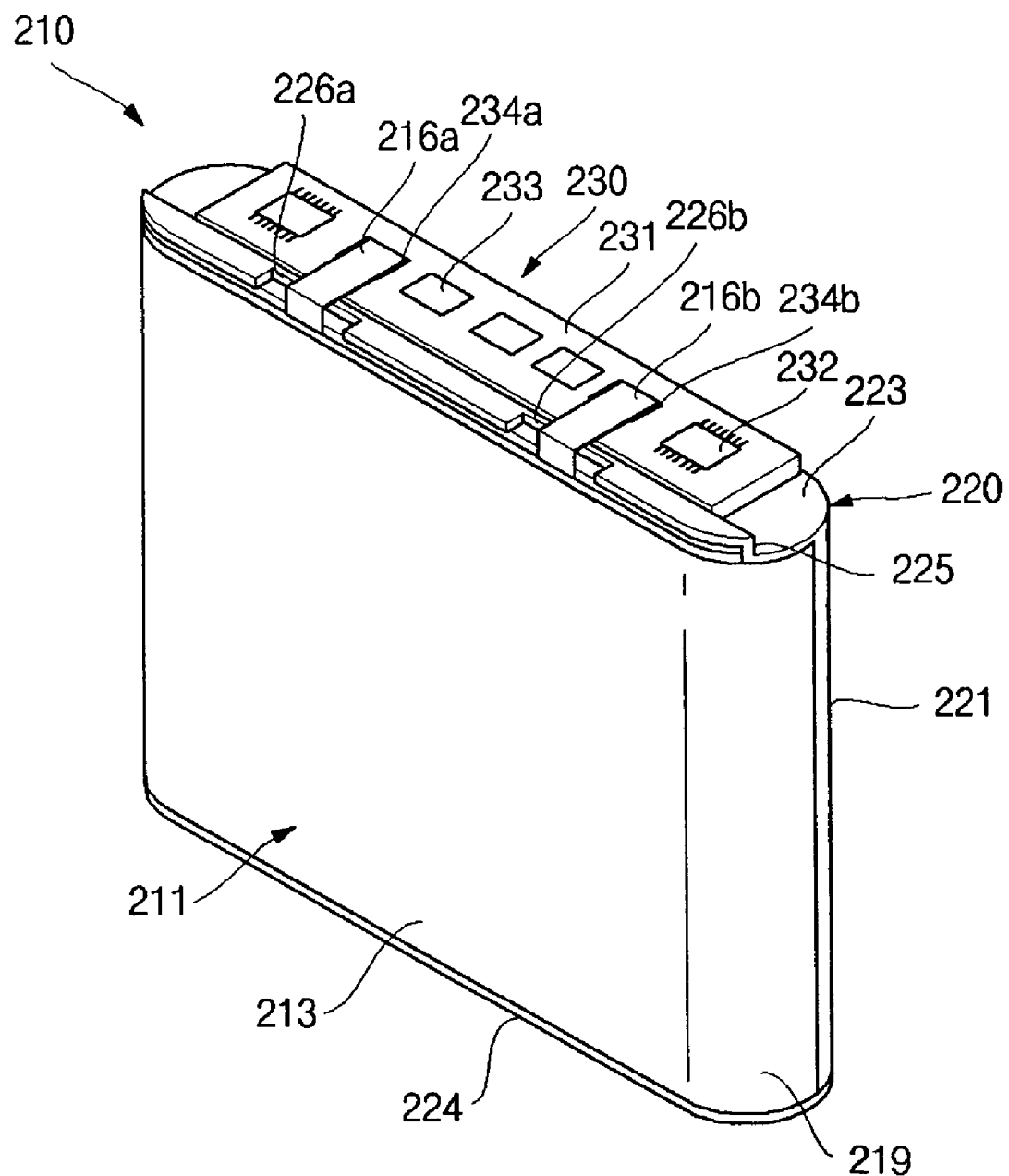
FIG. 9 is a perspective view showing the polymer battery pack of FIG. 7 in the assembled state prior to molding a resin sheath.

FIG. 9 is a perspective view showing the polymer battery pack of FIG. 7 in the assembled state prior to molding the resin sheath.

As shown, the inventive polymer battery pack has a bare cell 211, a frame case 220, a protection circuit board 231, etc., which are exposed to the outside prior to molding the resin sheath 240. This structure may be defined as a core pack 210.

Here, the bare cell 211 takes substantially the same construction as that used in the above-mentioned polymer battery pack 100. In the drawing, main walls 213 and rims 219 of the bare cell 211 are exposed to the outside through the frame case 220.

The frame case 220 is assembled to the bare cell 211 prior to molding the resin sheath 240, and takes a form of enclosing four sub-walls of the bare cell 211, wherein the four sub-walls are defined between the main walls 213 of the bare cell 211 and along the four sides of the main walls 213. In addition, the left and right peripheral walls of the frame case 220 are rounded.

Furthermore, a protection circuit member 230 is seated on the top of the frame case 220. The protection circuit member 230 includes a print circuit board 231, plural electrode terminals 233 formed on the print circuit board 231, conductive pads 234a and 234b formed on the printed (or print) circuit board 231, so that electrode tabs 216a and 216b are connected to the conductive pads 234a and 234b, respectively, and plural electronic components 232 are mounted on the print circuit board 231. The electrode tabs 216a and 216b are connected with an electrode assembly (not shown) positioned within the bare cell 211.

Here, the frame case 220 is manufacture through a method which is different from the method of manufacturing the above-mentioned resin sheath 120 of the polymer battery pack 100. Specifically, the flame case 220 may be preformed through a separate process, rather than being formed by being settled along with bare cell 211 within a mold.

The construction of the frame case 220 is now described in more detail.

Figure 10:
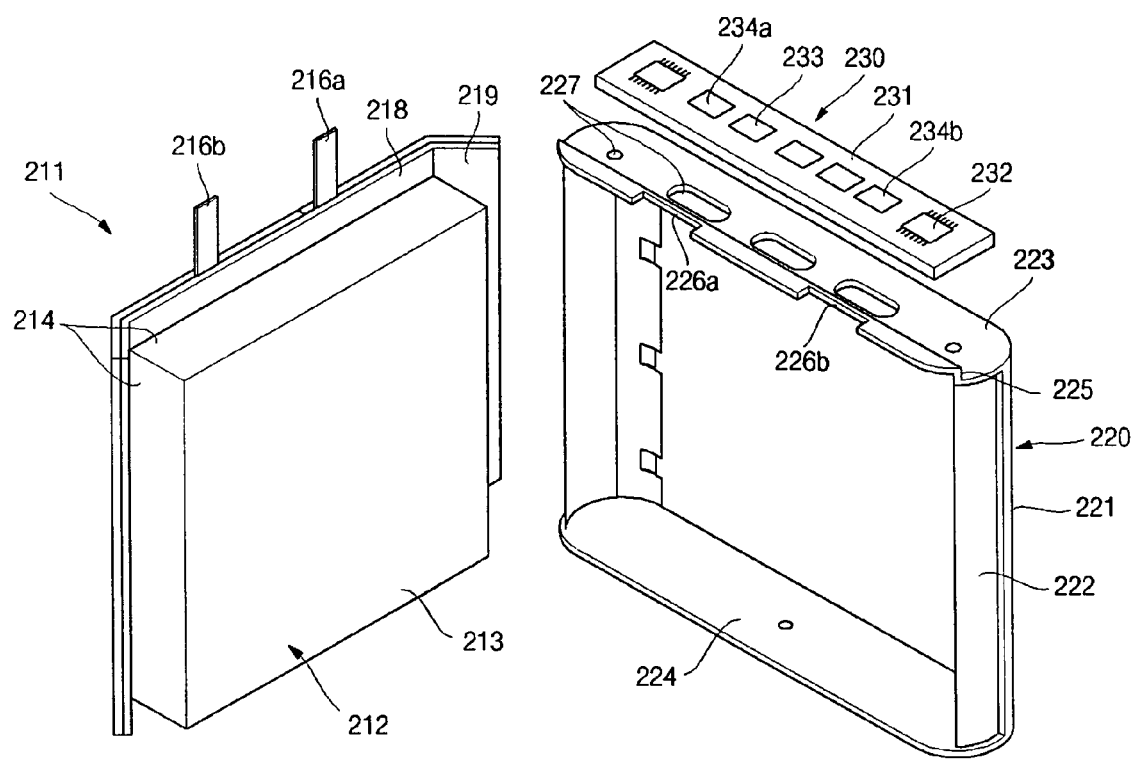
FIG. 10 is a perspective view showing the polymer battery pack of FIG. 7 in the disassembled state prior to molding the resin sheath.

FIG. 10 is an exploded perspective view of the polymer battery pack prior to molding the resin sheath.

As shown, the bare cell 211 includes four sub-walls 214 and two main walls 213, all of which form a pouch 212. Among the four sub-walls 214 of the bare cell 211, two laterally opposite sub-walls 214 are respectively formed with two rims 219, which extend by a predetermined length. The two rims 219 do not come into close contact with the corresponding sub-walls 214, unlike the polymer battery pack 100. Two electrode tabs 216a and 216b are extend by a predetermined length through the top area 218 of the pouch 212.

The frame case 220 includes two rounded peripheral walls 221 formed on the left and right sides of the frame case 220, a top side peripheral wall 223 extending between the top ends of the rounded peripheral walls 221, wherein the protection circuit member 230 is seated on the top side peripheral wall 223, and a bottom side peripheral wall 224 extending between the bottom ends of the rounded peripheral walls 221, wherein the bare cell 211 is seated on the bottom side peripheral wall 224. Here, each of the rounded peripheral walls 221 is formed with a groove 222 with a predetermined depth, wherein the above-mentioned rims 219 formed on the sub-walls 214 of the bare cell 211 are received on the grooves 222, respectively. In addition, an extension wall 225 with a predetermined thickness extends from a side of the top side peripheral wall 223, wherein the extension wall 225 is formed with tab guide grooves 226a and 226b, through which the electrode tabs 216a and 216b extend, respectively. In addition, the flame case 220, in particular, the top side peripheral wall 223 is formed with a plurality of holes 227. The holes 227 help the inside of the flame case 220 to be filled with a certain amount of resin in the process of molding the resin sheath, beyond the outer surface of the frame case 220.

Figure 11:
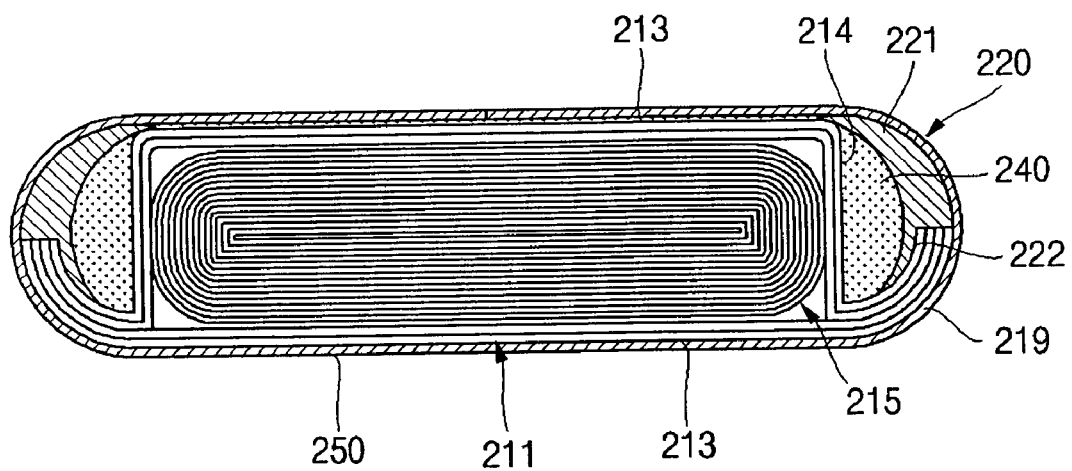
FIG. 11 is a cross-sectional view taken along line 11-11 of FIG. 7.

FIG. 11 is a cross-sectional view taken along line 11-11 of FIG. 7.

As shown, the rounded peripheral walls 221 of the frame case 220 have surfaces formed substantially in a round shape. Each of the rounded peripheral walls 221 is formed with a recess 222 of a predetermined length on its outer surface, and a corresponding rim 219 formed on the pouch 212 of the bare cell 211 is received in the recess 222. In addition, the surfaces of the frame case 220 and the bare cell 211 are wrapped by the finishing tape 250. Furthermore, spaces may be formed between the rounded peripheral walls 221 of the frame case 220 and the sub-walls 214 of the bare cell 211, and the spaces may be filled with the resin 240. Moreover, the resin 240 may form a very thin film on the surfaces of the main walls 213 and the rims 219 of the bare cell 211, and the rounded peripheral walls 221 of the flame case 220. Therefore, the frame case 220 is coupled to the sub-walls 214 of the bare cell 211, and the resin 240 and the finishing tape 250 are attached to the main walls 213 of the bare cell 211, whereby the strength of the polymer battery pack can be further increased.

Figure 12:
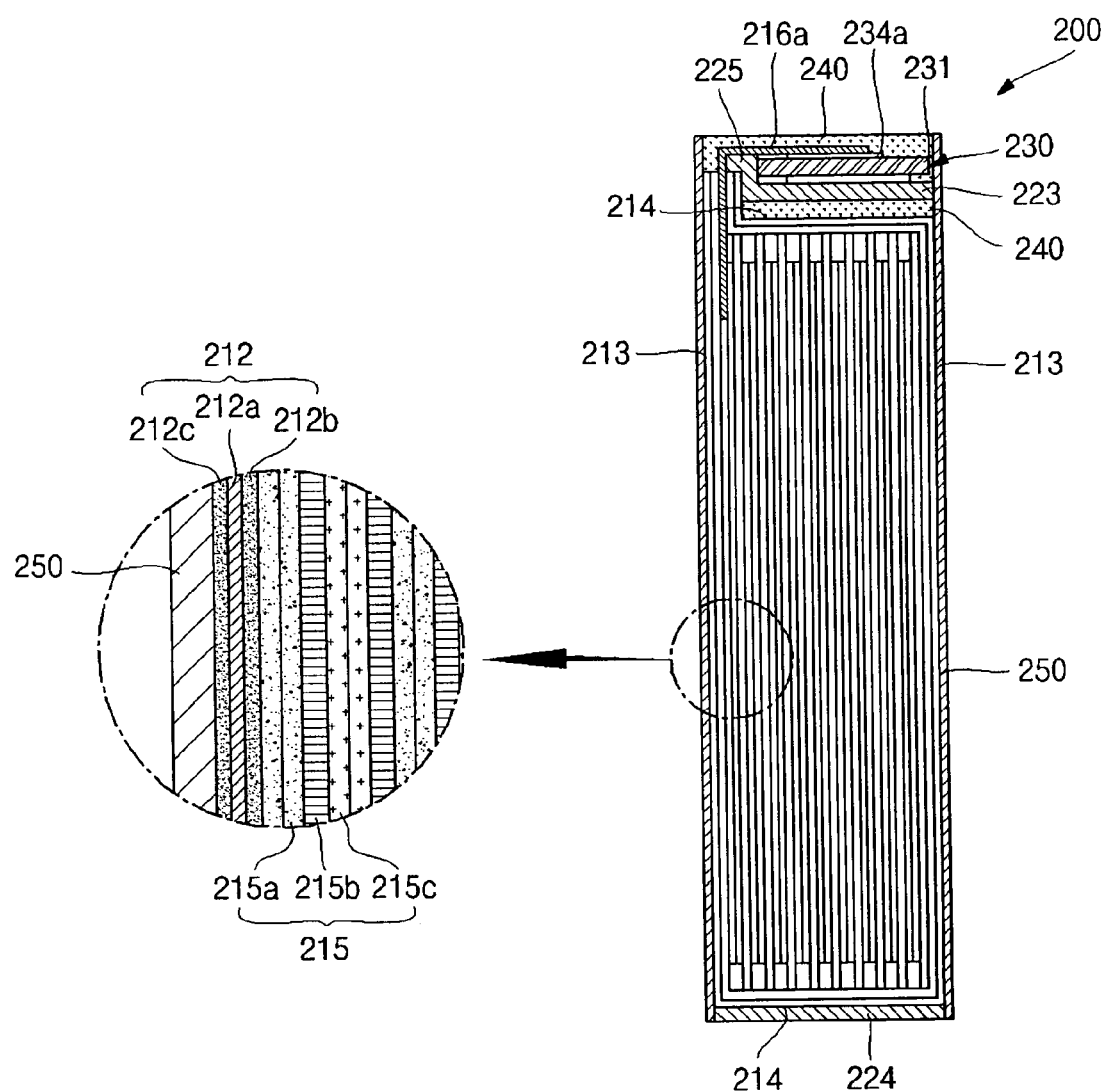
FIG. 12 is a cross-sectional view taken along line 12-12 of FIG. 7.

FIG. 12 is a cross-sectional view taken along line 12-12 of FIG. 7.

As shown, the resin sheath 240 encloses the protection circuit member 230 and the flame case 220 positioned under the protection circuit member 230 (i.e., the top side peripheral wall 223). The resin sheath 240 also substantially encloses the top area of the bare cell 211. Therefore, the protection circuit member 230 is prevented from easily escaping from the resin 240 during an external impact. Although not shown in the drawing, the electrode terminals formed on the protection circuit member 230 are adapted to be exposed to the outside through the resin sheath 240. In addition, although not shown in the drawing, the resin sheath 240 may be formed in a thin film on the main walls of the bare cell 211. The reason why the resin sheath 240 is formed in a thin film even on the main walls 213 of the bare cell 211 is because a high pressure is provided during the resin molding process. Of course, because the resin sheath in a form of thin film formed on the main walls 213 of the bare cell 211 is entirely concealed by the finishing tape 250, it is not observed from the outside of the completed polymer battery pack 200.

Meanwhile, as shown in the drawing, the pouch 212 of the bare cell 211 includes a metallic layer 212a, a first insulation layer 212b and a second insulation layer 212c, and the electrode assembly 215 includes a positive electrode 215a, a separator 215b and a negative electrode 215c. Because these constructions are fully described above, additional description is omitted.

Figure 13:
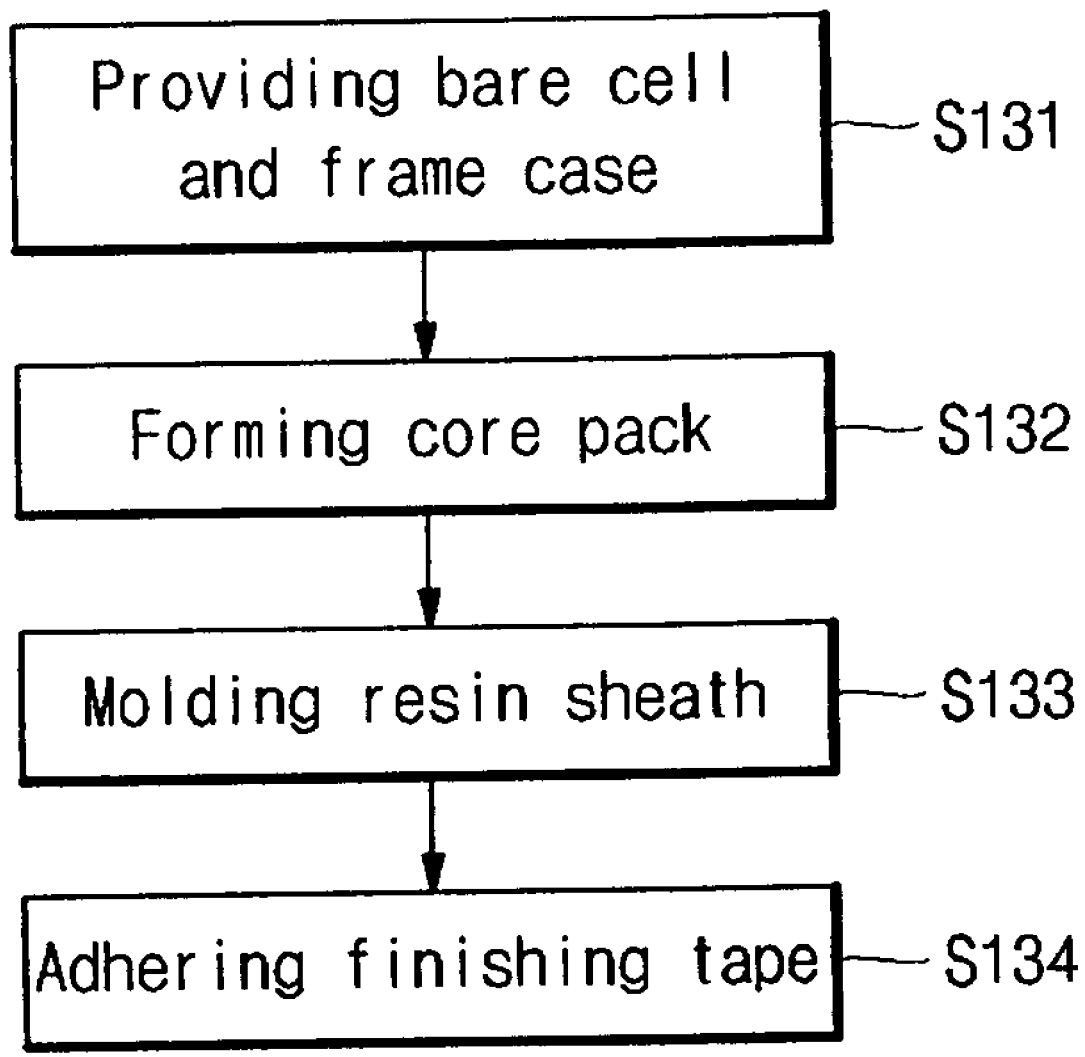
FIG. 13 is a flowchart illustrating a method of manufacturing the polymer battery pack according to another embodiment.

FIG. 13 is a flowchart of a polymer battery pack manufacturing method according to another embodiment of the present invention.

As shown, the inventive polymer battery pack manufacturing method includes steps of: providing a bare cell 211 and a frame case 220, wherein the bare cell 211 has main walls and sub-walls and is seated on the frame case 220 in a state in which the main walls of the bare cell 211 are exposed (S131); forming a core pack 210 by joining the bare cell 211 to the frame case 220, then seating a protection circuit member 230 on one of the peripheral walls of the of the frame case 220, and then electrically interconnecting the bare cell 211 and the protection circuit member 230 (S132); molding a resin sheath 240 over the core pack 210 in such a manner that electrode terminals, which are formed on the protection circuit member 230, are exposed to the outside (S133); and adhering finishing tape 250 to the resin sheath 240 and the surfaces of the core pack 210, which are exposed through the resin sheath 240, whereby the resin sheath 240 and the exposed surfaces of the core pack 210 are enclosed by the finishing tape 250 (S134).

FIGS. 13a to 13e show the steps of the polymer battery pack manufacturing method of FIG. 13 in sequence.

The steps are now described in more detail with reference to the accompanying drawings. However, because the materials, features or the like of the respective components are substantially same with those described above, description is made principally in terms of the polymer battery pack manufacturing method.

Figure 13A:
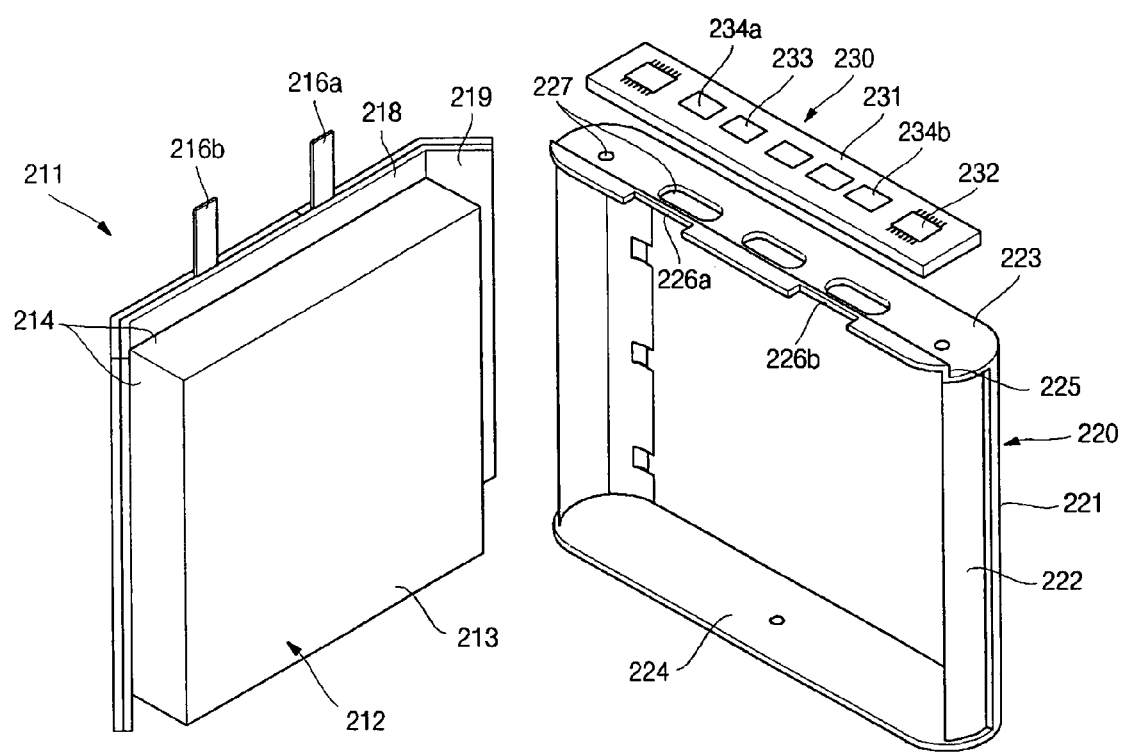
FIGS. 13a through 13e show the steps of the polymer battery pack manufacturing method of FIG. 13 in sequence.

FIG. 13a shows the bare cell and frame case providing step (S131).

In the bare cell and frame case providing step (S131), a bare cell 211 and a frame case 220 are formed, wherein the bare cell 218 has four sub-walls 214, two main walls 213, two rims 219, which are formed on two laterally opposite sub-walls 214, a top area 218, and electrode tabs 216a and 216b extending through the top area 218, and the frame case 220 includes four peripheral walls (i.e., two rounded peripheral walls 221, a top side peripheral wall 223 and a bottom side peripheral wall 224), which are configured in such a way that the bare cell 211 is engaged with the four peripheral walls. Here, the frame case 220 is formed in advance by molding a resin, and the bare cell 211 is engaged with the frame case 211 during a manufacturing process. In addition, the frame case 220 is formed with a plurality of holes 227, which help the resin sheath to be formed on the inner surface as well as the outer surface of the frame case 220. Furthermore, there is also provided a protection circuit member 230, which is connected to the electrode tabs 216a and 216b of the bare cell 211, thereby preventing the overcharge and overdischarge of the bare cell 211. The protection circuit member 230 includes a print circuit board 231, conductive pads 234a and 234b formed on the print circuit board and respectively connected to the electrode tabs 216a and 216b, plural electrode terminals 233 for connecting an external charger or system, and plural electronic components 232.

Figure 13B:
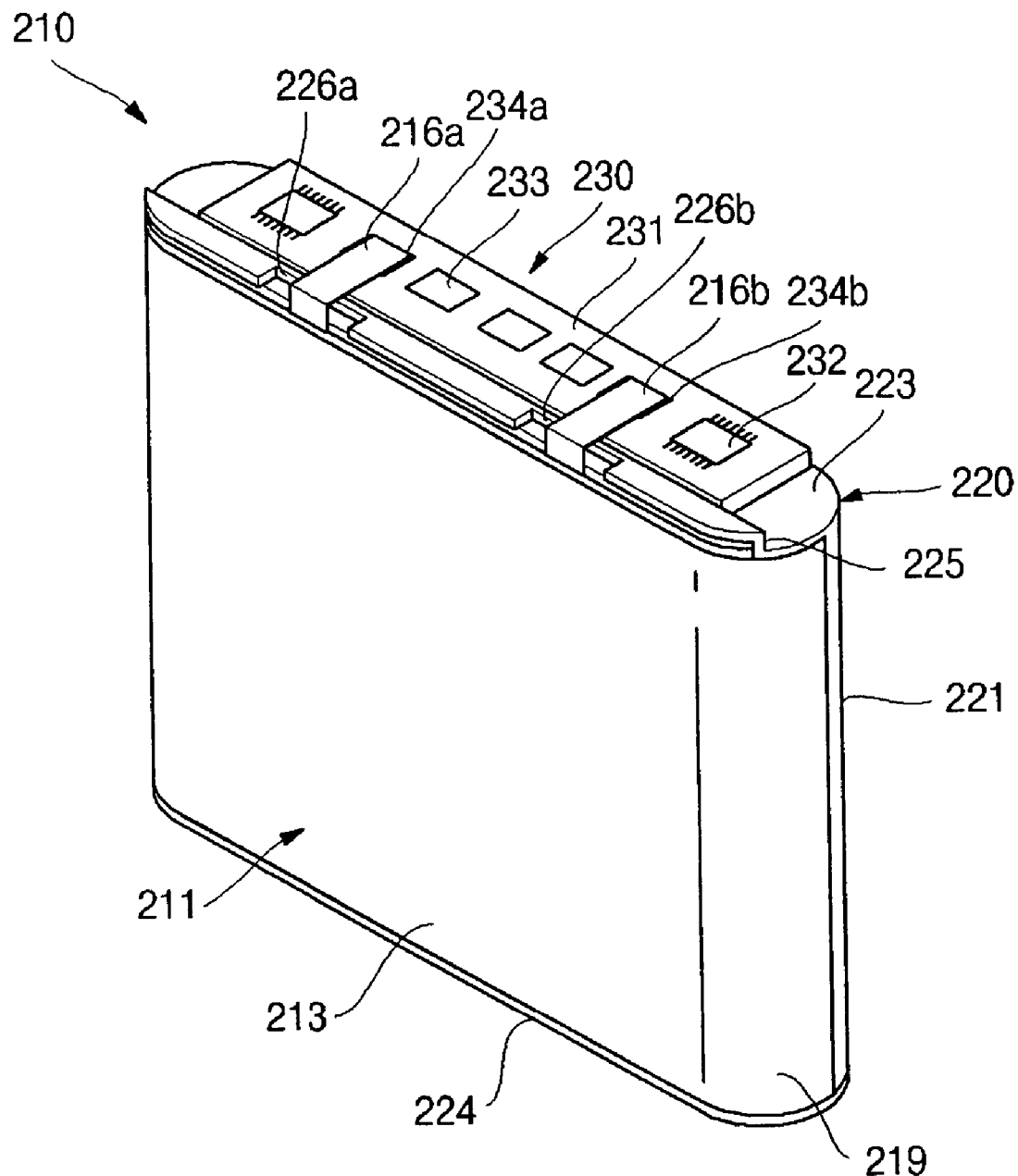

FIG. 13b shows the core pack forming step (S132).

In the core pack forming step (S132), the bare cell 211 is engaged with frame case 220 and then the protection circuit member 230 is seated on the top side peripheral wall 223 of the frame case 220. Next, the two electrode tabs 216a and 216b drawn out from the bare cell 211 are respectively connected to the electrode pads 234a and 234b formed on the protection circuit member 230. The connection of the electrode tabs 216a and 216b may be preferably but not exclusively executed by resistance welding, supersonic welding, laser welding, soldering or the like. At this time, the rims 219 provided on the laterally opposite sub-walls of the bare cell 211, are received in the grooves 222 formed on the rounded peripheral walls 221 of the frame case 220, whereby the laterally opposite sub-walls of the bare cell 211 take substantially round forms, respectively.

Figure 13C:
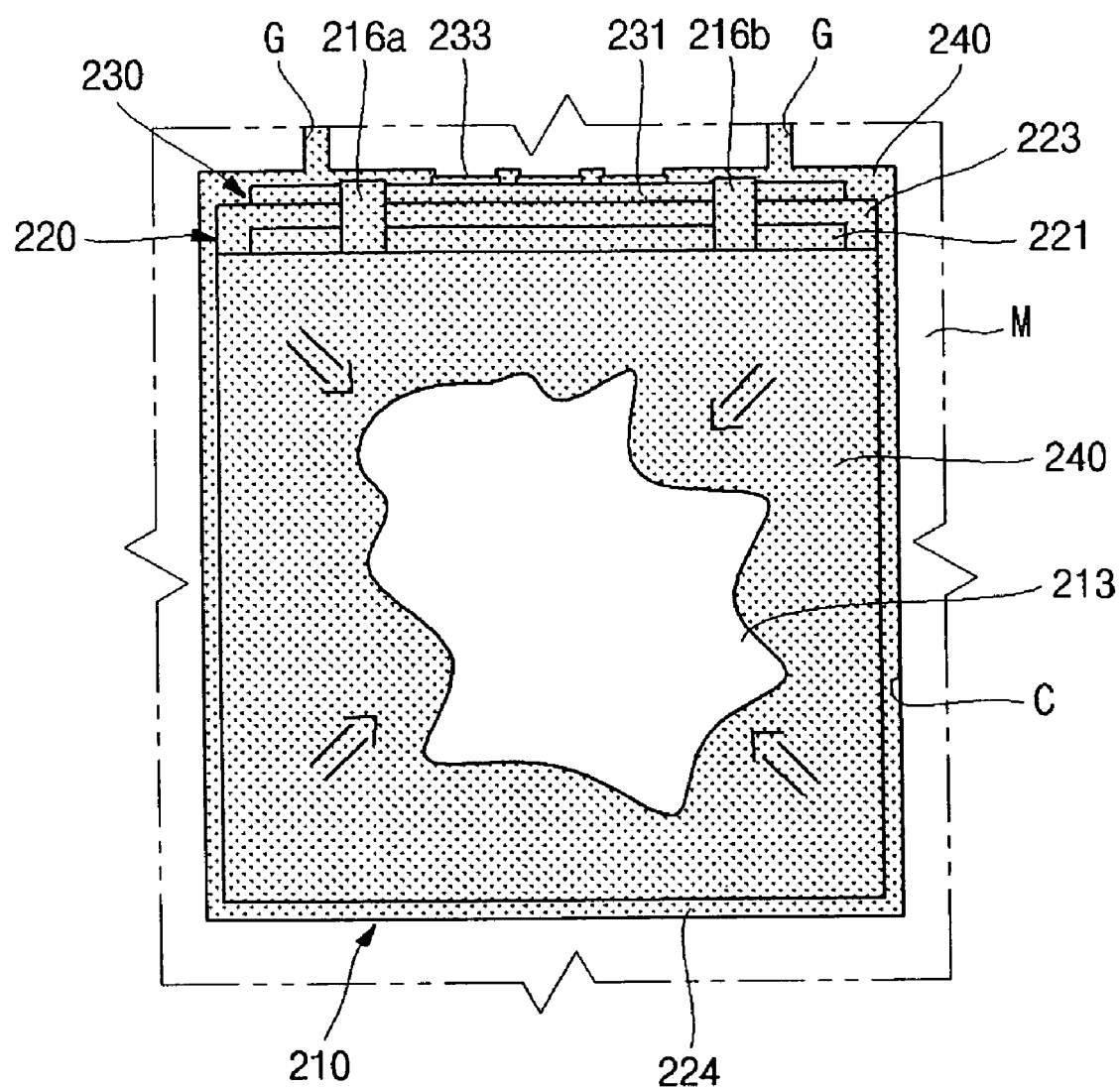
Figure 13D:
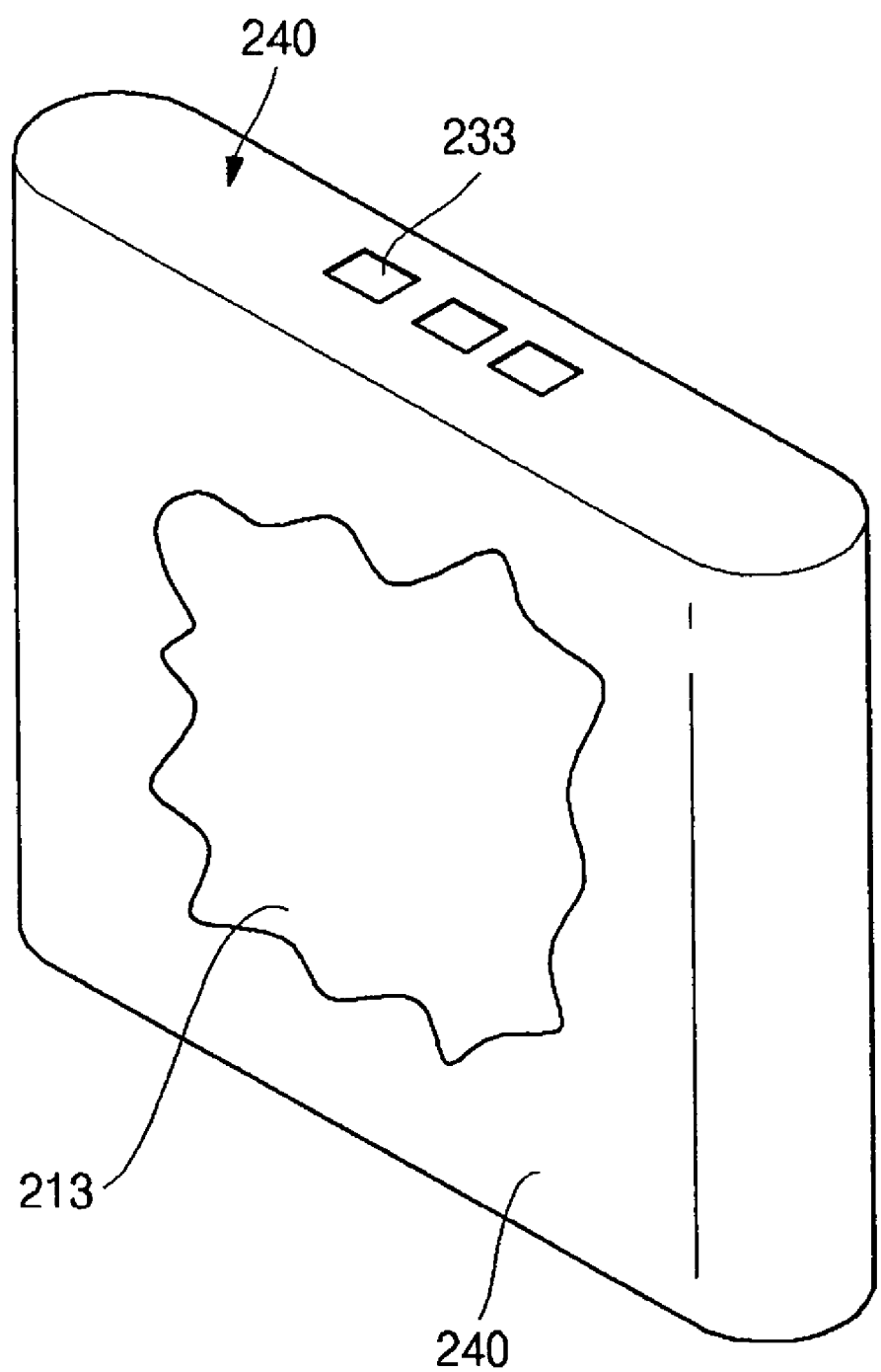

FIGS. 13c and 13d show the resin sheath molding step (S133).

In the resin sheath molding step S133, the core pack 210 is settled in a mold M which is formed with a cavity C of a predetermined shape. At this time, the main walls 213 of the bare cell 211, which are exposed to the outside of the frame case 220 of the core pack 210, come into close contact with projections (not shown) of the mold M. In addition, the electrode terminals 233 of the protection circuit member 230 also come into close contact with a projection "T" of the mold M. In the other areas, gaps are formed between the core pack 210 and the mold M. If the gaps are filled with resin, which is selected from, for example, polyamid, polyurethane, plastic, fiber reinforced plastic, engineering plastic, hot melt resin or the like, under high temperature and high pressure, and then the resin is cooled, the resin sheath 240 is molded on the entire area except the main walls 213 of the bare cells 211 and the electrode terminals 233. However, the resin sheath 240 may be formed in a thin film on the main walls of the bare cell 211. This is because a small amount of the resin 240 may be introduced between the main walls 213 of the bare cell 211 and the projections of the mold M.

Figure 13E:
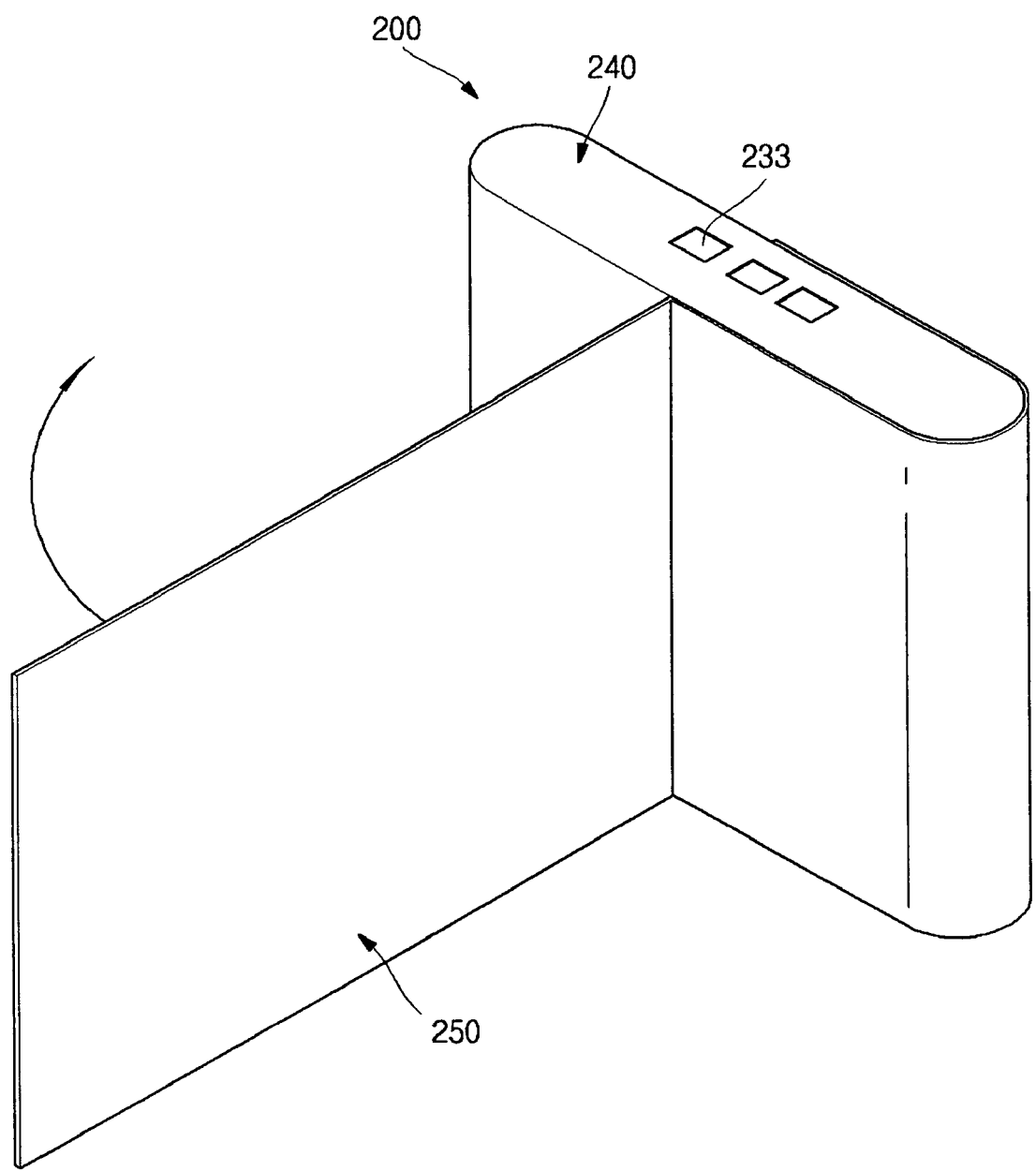

FIG. 13e shows the finishing tape adhering step (S134).

In the finishing tape adhering step (S134), the polymer battery pack, for which the resin molding has been completed, is wrapped by the finishing tape 250. That is, there may be resin traces remaining on the main walls 213 of the bare cell 211 of the polymer battery pack, thereby deteriorating the appearance of the polymer battery pack. Accordingly, the polymer battery pack is wrapped by the finishing tape 250 at least one time so that the resin trees are not observed from the outside. It is also possible to print the manufacturer's name, manufacturing date, pack type of the polymer battery pack, or the like on the finishing tape 250.

As described above, according to the inventive polymer battery pack and the method of manufacturing the same, a pouch type bare cell, the outer walls of which are poor in strength, is enclosed by a frame case and one or more finishing tape, whereby the strength of the bare cell can be increased and the reliability of the bare cell can be improved.

In addition, according to the present invention, because it is possible to reduce the thickness of the frame case and the finishing tape to 0.1 to 0.2 mm, it is possible to increase the battery capacitance to the extent of an increased space obtained by reducing the thickness. That is, although a marginal area of about 0.8 mm width (0.4 mm for one side) was required in a case for supersonic welding in the prior art, the present invention does not require such space, whereby, in fact, the inventive polymer battery pack can receive a bare cell (or a core pack), which has a capacitance of 850 mAh or more.

Although preferred embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A polymer battery pack comprising:
  a bare cell comprising main walls and sub-walls;
  a frame case enclosing the sub-walls of said bare cell and accommodating exposure of the main walls of said bare cell to the exterior of the frame case;

a protection circuit member seated on an outer surface of said frame case and electrically connected with said bare cell, a surface of said protection circuit member being formed with at least one electrode terminal; and a resin sheath enclosing said protection circuit member and accommodating exposure of the at least one electrode terminal to the exterior of the frame case, said resin sheath enclosing said bare cell, said frame case and said protection circuit member while preserving the exposure of the at least one electrode terminal and the main walls through said frame case to an exterior of the resin sheath.

2. The polymer battery pack as claimed in claim 1, wherein said bare cell comprises:

an electrode assembly including a first electrode, a separator, and a second electrode;

first and second electrode tabs connected to said first and second electrodes, respectively, and extend to the outside by a predetermined length; and a pouch including two main walls, enclosing relatively broad two areas of the electrode assembly, and four sub walls, which enclose relatively narrow four areas of the electrode assembly as compared to the two main walls, wherein among the four sub-walls, two opposite sub-walls are each provided with a marginal area which extend to the outside by a predetermined length.

3. The polymer battery pack as claimed in claim 2, wherein said frame case comprises:

rounded peripheral walls formed on the positions corresponding to the two opposite sub-walls of said bare cell;

a top side peripheral wall formed between the top ends of the rounded peripheral walls, said protection circuit member being seated on the top side peripheral walls; and a bottom side peripheral wall formed between the bottom ends of the rounded peripheral walls, said bare cell being seated on the bottom side peripheral wall.

4. The polymer battery pack as claimed in claim 3, wherein the outer surfaces of the rounded peripheral walls of the frame case are each formed with a recess, accommodating the margin areas of said bare cell being received in the recesses, respectively.

5. The polymer battery pack as claimed in claim 3, wherein the top side peripheral wall of said frame case has a side wall formed at one side of the top side peripheral wall in a predetermined thickness, and the side wall is formed with one or more tab guide grooves for allowing the electrode tabs, which interconnect the bare cell and said protection circuit member, to extend through the tab guide grooves.

6. The polymer battery pack as claimed in claim 2, wherein said frame case is formed with a plurality of holes, accommodating said resin to flow into the inside of said frame case as well as over the outside of said frame case.

7. The polymer battery pack as claimed in claim 3, further comprising continuous finishing tape being adhered to the main walls of said bare cell and the rounded peripheral walls of said frame case at least one time.

8. The polymer battery pack as claimed in claim 2, wherein each of the main walls and sub walls of the pouch comprises a first insulation layer, a metallic layer, and a second insulation layer sequentially stacked together.

* * * * *